United States Patent
Tashiro et al.

(10) Patent No.: US 6,704,641 B2
(45) Date of Patent: Mar. 9, 2004

(54) AUTOMOTIVE INTEGRATED CONTROL SYSTEM

(75) Inventors: Tsutomu Tashiro, Nagoya (JP); Noboru Miyamoto, Kariya (JP); Takehito Fujii, Kariya (JP); Motoaki Kataoka, Kariya (JP); Yoshifumi Kato, Aichi-ken (JP)

(73) Assignee: Denso Corporation, Kariya (JP)

(*) Notice: Subject to any disclaimer, the term of this patent is extended or adjusted under 35 U.S.C. 154(b) by 114 days.

(21) Appl. No.: 09/968,613

(22) Filed: Oct. 2, 2001

(65) Prior Publication Data

US 2002/0038647 A1 Apr. 4, 2002

(30) Foreign Application Priority Data

Oct. 2, 2000 (JP) ......................................... 2000-302108
Sep. 7, 2001 (JP) ......................................... 2001-271989

(51) Int. Cl.[7] ............................. G06F 19/00; G06F 7/70
(52) U.S. Cl. ........................ 701/110; 123/350; 123/90.15; 180/197
(58) Field of Search ............................. 123/350, 339.9, 123/406.64, 406.65, 90.15, 436; 701/54, 96, 91, 33, 35, 110, 102, 115, 129; 180/197, 79.1

(56) References Cited

U.S. PATENT DOCUMENTS 5,351,776 A   10/1994  Keller et al. ............... 180/79.1
5,483,927 A * 1/1996   Letang et al. ............. 123/41.12
5,832,397 A * 11/1998  Yoshida et al. ................ 701/29
5,832,401 A * 11/1998  Ueda et al. .................... 701/55
5,899,950 A * 5/1999   Milender et al. ............. 701/50

FOREIGN PATENT DOCUMENTS

EP    1034982 A2    3/2000
JP    5-85228       4/1993
JP    2000-257501   9/2000

* cited by examiner

Primary Examiner—Henry C. Yuen
Assistant Examiner—Johnny H. Hoang
(74) Attorney, Agent, or Firm—Nixon & Vanderhye P.C.

(57) ABSTRACT

Automotive control system designed to control a plurality of controlled elements installed in the vehicle is provided. The control system includes control circuits and a manager circuit. The control circuits are designed to perform given control tasks using pre-defined controlled variables. The manager circuit is designed to determine a target value of a preselected output parameter of at least one of the controlled elements in the form of a second controlled variable different from one of the controlled variables employed in the control circuit for the one of the controlled elements. The control system also includes an adaptor designed to translate the second controlled variable indicative of the target value of the output parameter into a value of the corresponding controlled variable. This allows the control system to be constructed easily without redesigning typical controlled elements.

35 Claims, 17 Drawing Sheets

AUTOMOTIVE INTEGRATED CONTROL SYSTEM

BACKGROUND OF THE INVENTION

1. Technical Field of the Invention

The present invention relates generally to an easy-to-construct structure of an integrated control system for automotive vehicles which is designed to control a plurality of controlled elements such as an engine and an automatic transmission installed in a vehicle.

2. Background Art

U.S. Pat. No. 5,351,776 to Keller et al. teaches an automotive control system which works to control a plurality of controlled elements installed in the vehicle and is designed to have a structure easy to develop for a decreased period of time.

The control system defines the controlled elements such as an engine power control, a transmission control, a braking control, and a steering control arranged in a plurality of hierarchial levels and provides controlled performance required from the higher hierarchial level. The classification of the controlled elements into the hierarchial levels results in a decrease in number of the controlled elements to be changed in design when the specification of the system is to be changed, thus decreasing the time required for the change in system specification and permitting some of the controlled elements to be developed in parallel within decreased terms.

The control system, however, has a drawback in that the controlled elements should be so designed as to handle common controlled variables, which requires all the controlled elements to be redesigned.

Usually, control tasks to be carried out in typical engine control and transmission control systems are designed for every vehicle. Controlled variables used in carrying out the control tasks are also set for every vehicle. Thus, in a case where typical engine power control and transmission control devices are defined as the controlled elements of lower hierarchial levels in construction of the above control system, it may become impossible to operate the engine power control and transmission control devices using commands issued from the controlled elements of higher hierarchial levels. It, thus, becomes necessary to redesign the control tasks to be executed in the engine power control and transmission control devices or to change controlled variables to be used in the control tasks.

SUMMARY OF THE INVENTION

It is therefore a principal object of the invention to avoid the disadvantages of the prior art.

It is another object of the invention to provide an integrated control system for a vehicle which is easy to construct without redesigning control tasks to be executed in typical controlled elements and/or changing controlled variables to be used in the control tasks.

According to one aspect of the invention, there is provided an integrated control system for a vehicle designed to have a structure which is easy to construct without redesigning a plurality of controlled elements such as components of a power train of the vehicle. The control system comprises: (a) a manager circuit providing a plurality of target values of given controlled variables; (b) a plurality of control circuits designed to perform given control tasks of controlling operations of a plurality of controlled elements installed in the vehicle for bringing the controlled variables into agreement with the target values provided by the manager circuit; and (c) a translating circuit translating the target value of at least one of the controlled variables into a target value of a second controlled variable which is predefined as being used in performing at least one of the control tasks in the control circuits to bring the one of the controlled variables into agreement with the target value.

In the preferred mode of the invention, a condition comparing means is further provided which compares a given controlled variable-related condition associated with the controlled element which is controlled in operation using the second controlled variable with a reference controlled variable-related condition to determine a difference therebetween. A translation correcting means is provided which corrects a translation scheme of the translating circuit so as to compensate for an error between the target value of the one of the controlled variables and an actual one arising from the difference between the controlled variable-related condition and the reference controlled variable-related condition.

A correcting means may alternatively be provided which corrects the target value of the one of the controlled variables so as to compensate for an error between the target value and an actual one arising from the difference between the controlled variable-related condition and the reference controlled variable-related condition.

At least one of the control circuits may alternatively produce a target value of a third controlled variable as a control request to another of the controlled circuits which is different from the controlled variable provided by the manager circuit to the another of the control circuits. A controlled variable translating circuit is provided which is designed to translate the target value of the third controlled variable into a target value of the controlled variable provided by the manager circuit to the another of the control circuits.

The translating circuit translates the target value of the controlled variable provided by the manager circuit to the another of the control circuits plus the target value translated by the control variable translating circuit into a target value of the second controlled variable which is predefined as being used in performing the control task in the another of the control circuits.

The control circuits may be designed to control operations of controlled elements of a power trains of the vehicle including an engine. The manager circuit determines the target values of the controlled variables so that a drive force of the vehicle reaches a target one. The translating circuit translates the target value of the controlled variable into the target value of the second controlled variable as a function of speed of the engine.

One of the control circuits designed to control the engine may be an engine control circuit. In this case, at least one of the control circuits except the engine control circuit provides a control request signal indicative of a target retard ignition angle to the engine control circuit. The controlled variable translating circuit is designed to translate the target retard ignition angle into a target value of the controlled variable provided by the manager circuit to the engine control circuit. The translating circuit adds the target value of the controlled variable provided by the manager circuit to the engine control circuit to the target value translated by the controlled variable translating circuit to provide an ultimate target value of the controlled variable to the engine control circuit.

The manager circuit may provide a controlled parameter indicative of either of a target engine torque and a target engine output power as the target value of the controlled variables to the engine control circuit. The translating circuit translates the controlled parameter into a second controlled parameter indicative of a target position of a throttle valve of the engine. The engine control circuit performs a throttle control task to actuate the throttle valve so that the target position of the throttle valve is reached.

The translating circuit works to translate the controlled parameter into the second controlled parameter based on a response characteristic of the engine to a change in position of the throttle valve for compensating for a response lag between a change in engine torque and a change in position of the throttle valve.

At least one of the control circuits except the engine control circuit may provide a control request signal indicative of a target retard ignition angle to the engine control circuit. In this case the controlled variable translating circuit is designed to translate the target retard ignition angle into a correction parameter which indicates an amount of engine torque or engine output power to be changed and is equivalent in kind to the controlled variable provided by the manager circuit to the engine control circuit. The translating circuit corrects the controlled parameter indicative of either of the target engine torque and the target engine output power using the correction parameter and uses the corrected controlled parameter to produce the second controlled parameter indicative of the target position of the throttle valve of the engine.

The engine control circuit may also be designed to perform an ignition timing control task of retarding ignition timing of the engine. In this case, the translating circuit produces the second controlled parameter indicative of the target position of the throttle valve in a range within which as much of either of the target engine torque and the target engine output power as possible is reached and also translates a lack of either of the target engine torque and the target engine output power which is not achieved by control of the throttle valve into a target retard ignition angle achieved by performing the ignition timing control task in the engine control circuit.

A condition comparing means may further be provided which compares a given operating condition of the engine with a pre-defined reference operating condition of the engine to determine a difference therebetween. The translation correcting means may be designed which corrects the translation scheme of the translating circuit so as to compensate for an error between the target value of the one of the controlled variables and an actual one arising from the difference between the given operating condition and the pre-defined reference operating condition.

A correcting means may be provided which corrects the target value of the one of the controlled variables so as to compensate for an error between the target value and an actual one arising from a difference between the given operating condition and the pre-defined reference operating condition.

The difference as determined by the condition comparing means is at least one of (a) a difference between an actual ignition timing of the engine and a pre-defined reference ignition timing of the engine, (2) a difference between an actual atmospheric pressure and a pre-defined reference atmospheric pressure, (3) a difference between an actual boost pressure of a turbocharger installed in the engine and a pre-defined reference boost pressure of the turbocharger, (4) a difference between an actual opening timing of intake and exhaust valves of the engine and a pre-defined reference opening timing of the intake and exhaust valves, (5) a difference between an actual amount of lift of intake and exhaust valves of the engine and a pre-defined reference amount of lift of the intake and exhaust valves, (6) a difference between an actual amount of exhaust gas recirculated through an exhaust gas recirculation system and a pre-defined reference amount of recirculated exhaust gas, (7) a difference between an air-fuel ratio of a mixture supplied to the engine and a pre-defined reference air-fuel ratio of the engine, (8) a difference between a load exerted on the engine produced by an auxiliary mechanism driven by the engine and a pre-defined reference load, and (9) a difference between an actual output torque of the engine and a pre-defined reference output torque of the engine.

The power train may include an automatic transmission with a torque converter. In this case, the actual output torque may be determined based on a speed of the engine and a speed of an output shaft of the torque converter.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
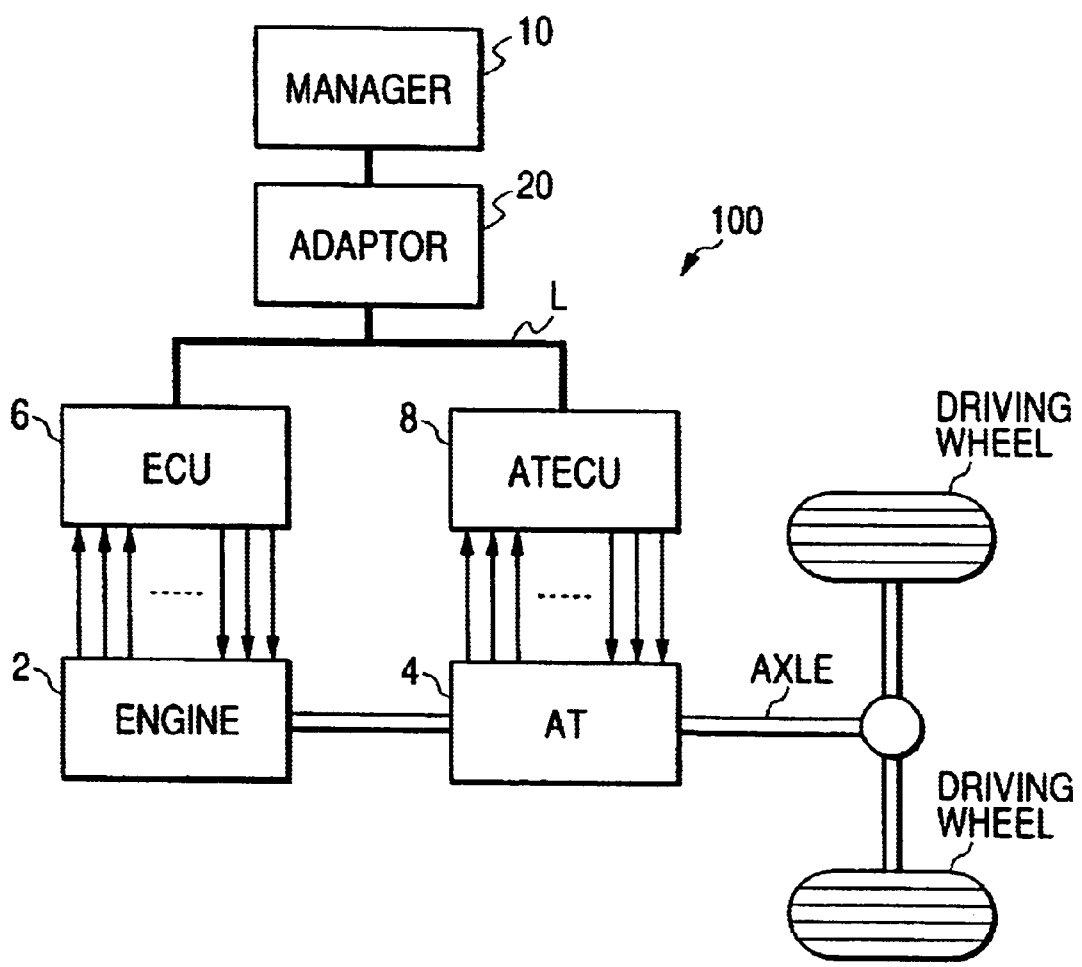
FIG. 1 is a block diagram which shows an integrated control circuit for automotive vehicles according to the first embodiment of the invention.

Referring to the drawings, wherein like reference numbers refer to like parts in several views, particularly to FIG. 1, there is shown an automotive integrated control system 100 according to the first embodiment of the invention.

The integrated control system 100 is designed, as an example in this embodiment, a power train control system which works to control structural elements of a power train: an engine 2 and an automatic transmission 4 equipped with a torque converter and includes an engine electronic control unit (ECU) 6, an automatic transmission electronic control unit (ATECU) 8, and an ECU manager 10 which provides target values of controlled variables to the engine ECU 6 and the ATECU 8. Note that the invention may be used in a case where the engine 2 is implemented by either of an internal combustion engine and an electric motor, but the following discussion will refer, as an example, to a case where the engine 2 is implemented by the internal combustion engine and that the following discussion will refer to, as an example, the integrated control system 100 as controlling operations of the power train, but the invention may be used with a total control system designed to control environmental parameters such as the temperature and humidity of a vehicular cabin and the quantity of solar radiation in addition to the power train.

The engine ECU 6, the ATECU 8, and the ECU manager 10 are each implemented by a separate arithmetic processing unit made of a microcomputer and have disposed therein transmitters connecting with each other through communication lines L for establishing transmission of data on power train control therebetween.

The engine ECU 6 has a signal input/output port which receives outputs of an accelerator pedal sensor, an air flow meter, an intake air temperature sensor, a throttle position sensor, an air-fuel ratio sensor, a knock sensor, a water temperature sensor, a crank angle sensor, and ignition switch. The accelerator pedal sensor detects the position of an accelerator pedal or the pedal effort of the vehicle operator. The air flow meter measures the flow rate of intake air entering the engine 2. The intake air temperature sensor measures the temperature of the intake air. The throttle position sensor measures the degree of opening or the position of a throttle valve installed in an intake pipe of the engine 2. The air-fuel ratio sensor is implemented by, for example, an oxygen ($O_2$) sensor which measures the concentration of oxygen in exhaust gasses for determining the air-fuel ratio of a mixture supplied to the engine 2. The knock sensor detects an engine knock. The water temperature sensor measures the temperature of cooling water for the engine 2. The crank angle sensor measures the angular position and the number of rotations of a crank shaft of the engine 2 which is a parameter indicating the speed of the engine 2. The ignition switch outputs an ON-signal indicating the ON-state of an ignition switch of the engine 2. The engine ECU 6 are also coupled electrically with engine control actuators: fuel injectors provided one for each cylinder of the engine 2, an ignitor producing an ignition high-voltage, a fuel pump supplying the fuel from a fuel tank to the fuel injectors, and a throttle drive motor opening or closing the throttle valve. These sensors and actuators are well known per se in the art, and explanation thereof in detail will be omitted here.

The ATECU 8 has a signal input/output port which receives outputs of a transmission speed sensor, a vehicle speed sensor, an oil temperature sensor, a shift position switch, and a stop lamp switch. The transmission speed sensor measures the speed of an input shaft of the automatic transmission 4 coupled with the torque converter. The vehicle speed sensor measures the speed of a drive shaft coupled with an output shaft of the automatic transmission 4 which indicates the speed of the vehicle. The oil temperature sensor measures the temperature of working oil within the automatic transmission 4. The shift position switch outputs a signal indicative of the position of a shift lever handled by the vehicle operator. The stop lamp switch outputs an on-off signal indicative of an on-off state of stop lamps which are turned on in response to the depression of a brake pedal by the vehicle operator. Specifically, the on-off signal indicates whether the vehicle operator has braked the vehicle or not. The ATECU 8 are also coupled with AT control actuators: a shift solenoid working to change the gear of the automatic transmission 4, a line pressure solenoid working to control the degree of engagement of a shift clutch, a lock-up solenoid working to control the degree of engagement of a lock-up clutch which establishes direct connection of input and output shafts of the torque converter.

The ECU manager 10, the engine ECU 5, and the ATECU 8 store control programs (i.e., control rules) in internal memories and execute them to control operations of the control system 100, the engine 2, the automatic transmission 4.

Control tasks to be executed by the ECU manager 10, the engine ECU 5, and the ATECU 8 will be described below.

The engine ECU 6 monitors the speed of the engine 2 as expressed by the output of the crank angle sensor and the quantity of intake air as measured by the air flow meter to determine main controlled variables on the quantity of fuel to be injected to the engine 2 and the ignition timing of the engine 2 and corrects the main controlled variables based on the temperature of the intake air as measured by the intake air temperature sensor, the number of occurrences of knocks as measured by the knock sensor, and the temperature of the cooling water as measured by the water temperature sensor to derive controlled engine variables representing a target quantity of fuel to be injected and a target ignition timing. Specifically, the engine ECU 6 determines the controlled engine variables to control the quantity of fuel to be injected to the engine 2 and the time of output of a high-voltage from the ignitor.

The throttle valve installed in the intake system of the engine 2 is implemented by the so-called linkless throttle valve designed to be opened and closed by the throttle drive motor. The engine ECU 6 also carries out a known throttle control task to bring the position of the throttle valve (will also be called the opening degree of the throttle valve below) into agreement with a target throttle position provided by the external.

The engine 2 is equipped with a valve timing control mechanism designed to control the timing where intake and exhaust valves are opened or closed, an exhaust gas recirculation mechanism designed to recirculate a portion of exhaust gas to an intake air passage of the engine 2, and a turbocharger designed to turn a turbine through the stream of exhaust gas to compress the air supplied to the engine 2. The engine ECU 6 carries out a typical variable valve timing control task to actuate the variable valve timing control mechanism as a function of engine operating conditions: the engine speed and the throttle position to control the timing where the intake and exhaust valves are opened or closed and a typical EGR control task to actuate the exhaust gas recirculation mechanism to control the amount of recirculated exhaust gas (EGR) as a function of the engine operating conditions.

The ATECU 8 executes a typical gear shifting task to actuate gear shift solenoids for achieving a desired gear ratio of the automatic transmission 4 and a line pressure solenoid for controlling the line pressure of the automatic transmission 4 to control the degree of engagement of a selected one of clutches. Specifically, when a target gear ratio is different from a current gear ratio of the automatic transmission 4, the ATECU 8 produces solenoid energizing signals as functions of the position of the throttle valve and outputs of the above described sensors and switches and outputs it to the gear shift solenoids to change the gear of the automatic transmission 4. Simultaneously, the ATECU 8 determines a target line pressure required to terminate a gear shift operation within a target shifting period of time as a function of a target engine torque and outputs it to the line pressure solenoid.

Additionally, the ATECU 8 also executes a lock-up clutch control task to produce a lock-up clutch control signal in view of a desired consumption of fuel and shift feel and outputs it to a lock-up pressure solenoid to control the state (disengagement, slippage, and engagement) of a lock-up clutch of the automatic transmission 4.

Specifically, the engine ECU 6 and the ATECU 8 execute the same engine control and AT control tasks as those in typical engine and AT control systems and control the operations of the engine 2 and the automatic transmission 4, respectively.

The ECU manager 10, as clearly shown in FIG. 2, includes a target axle torque determining circuit 12 and a target engine torque/gear ratio determining circuit 14 and executes a power train control task as described below. Specifically, the target axle torque determining circuit 12 monitors the position of the accelerator pedal indicating an acceleration/deceleration demand of the vehicle operator and the speed of the vehicle to determine a target axle torque specifying the behavior of the power train. The target engine torque/gear ratio determining circuit 14 determines a target engine torque and a target gear ratio (i.e., a target speed) of the automatic transmission 4 required to achieve a target axle torque as functions of the vehicle speed, the speed of the engine 2, and the current shift position of the shift lever. The position of the accelerator pedal, the vehicle speed, the speed of the engine 2, and the current shift position of the shift lever as used in the target axle torque determining circuit 12 and the target engine torque/gear ratio determining circuit 14 are parameters sent from the engine ECU 6 and the ATECU 8 via the communication lines L.

Specifically, the engine torque/gear ratio determining circuit 14 determines the target engine torque and the target gear ratio of the automatic transmission 4 by finding an optimum engine operating point according to a control rule defined in terms of the vehicle operator's demand as expressed by the shift position of the shift lever, the over-revolution avoidance, and the fuel consumption, emissions, and burning stability of the engine 2.

Note that the control rules as used in the target axle torque determining circuit 12 and the target engine torque/gear ratio determining circuit 14 to determine the above target values are provided by maps or arithmetic expressions stored in internal memories.

The engine torque/gear ratio determining circuit 14 outputs signals indicative of the target engine torque to the ATECU 8 and the engine ECU 6 and a signal indicative of the target gear ratio to the ATECU 8.

The engine ECU 6 and the ATECU 8 are, as already described, so designed as to perform the engine and AT control programs similar to those used in typical engine and AT ECUs. It is, thus impossible for the engine ECU 6 and the ATECU 8 to use the signal indicative of the target engine torque inputted directly from the ECU manager 10 for the engine and AT control. Accordingly, an adapter 20, as shown in FIG. 1, is disposed in the communication line L extending from the ECU manager 10 to the engine ECU 6 and the ATECU 8 which is operable to translate the target engine torque into a parameter indicative of a target throttle position the engine ECU 6 and the ATECU 8 can use as a controlled variable.

The adapter 20 is, like the ECU manager 10, the engine ECU 6, and the ATECU 8, made of an electronic control unit equipped with a microcomputer. The adapter 20 has installed therein a repeater establishing transmission of data between the ECU manager 10 and the engine ECU 6 and the ATECU 8, picks up the target engine torque from the data outputted from the ECU manager 10, and converts it into the target throttle position required to bring the output torque of the engine 2 into agreement with the target engine torque. The target throttle position is inputted in the form of a control signal into each of the engine ECU 6 and the ATECU 8.

Figure 2:
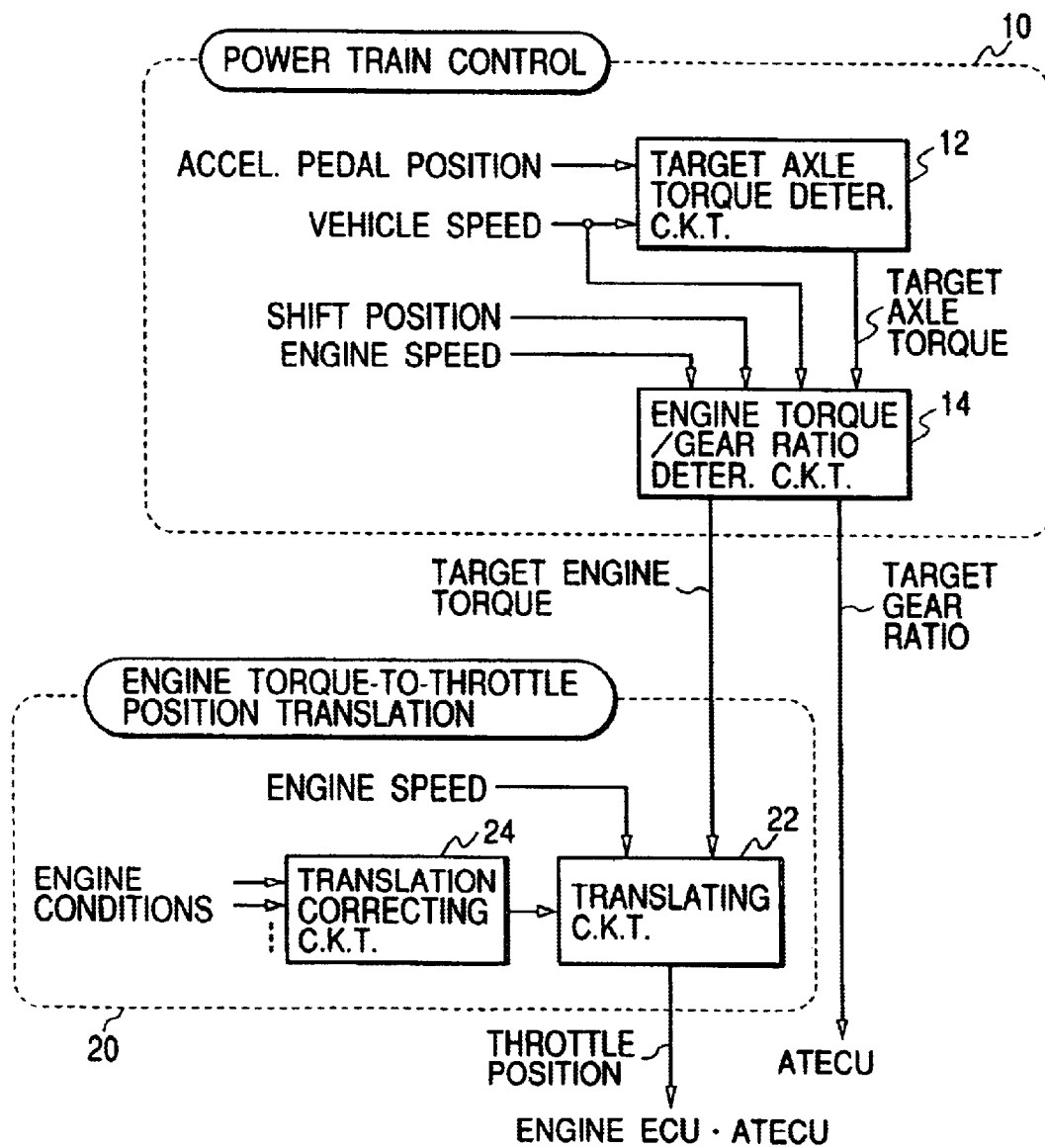
FIG. 2 is a block diagram which shows internal structures of an ECU manager and an adaptor installed in the control system of FIG. 1.
Figure 3:
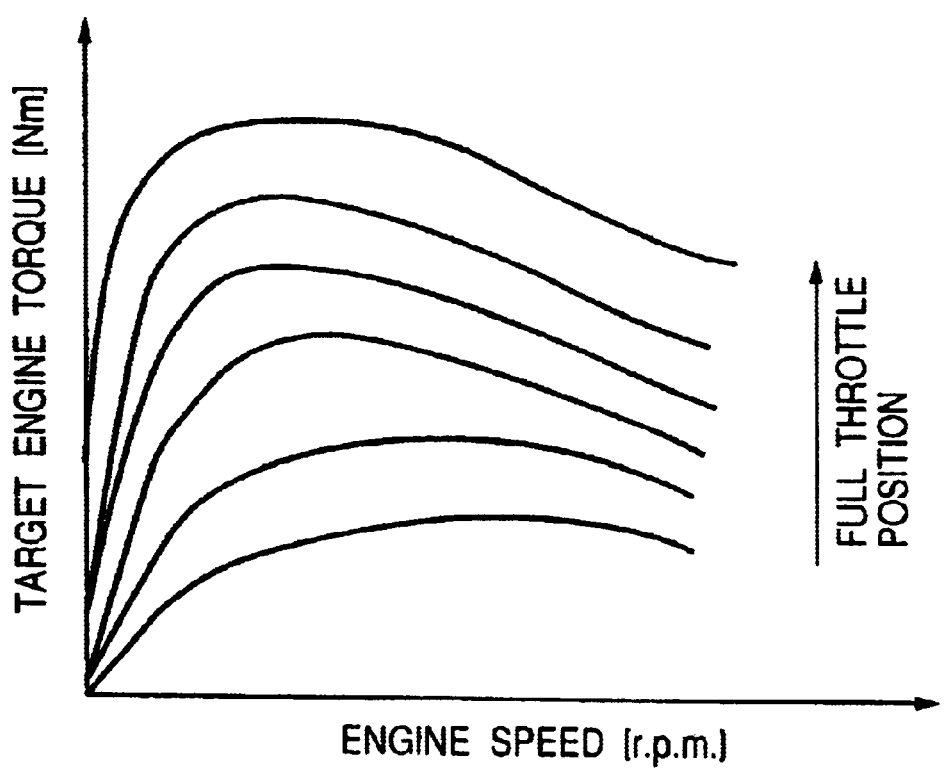
FIG. 3 is a map which represents a relation between a target engine torque and a throttle position in terms of engine speed.

Specifically, the microcomputer built in the adapter 20 includes, as shown in FIG. 2, a translating circuit 22 and a translation correcting circuit 24. The translation circuit 22 works to determine the target throttle position as functions of the target engine torque and the speed of the engine 2. Usually, the engine torque varies with the engine speed even when the degree of opening of the throttle valve (i.e., the throttle position) is constant (which is known as static torque characteristics). Thus, the translation circuit 22 looks up a map, as shown in FIG. 3, to determine the target throttle position.

Figure 4A:
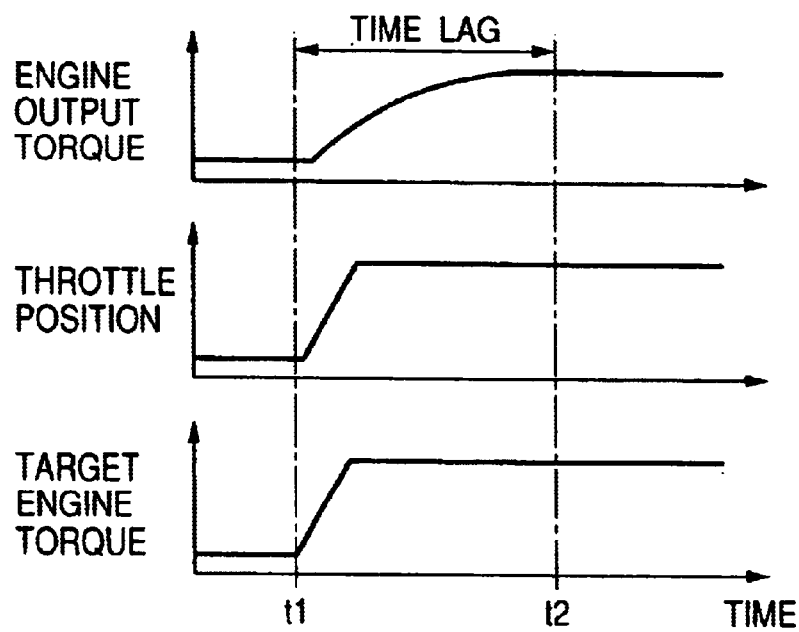
FIG. 4(a) shows a time chart which represents changes in engine output torque, throttle position, and target engine torque.
Figure 4B:
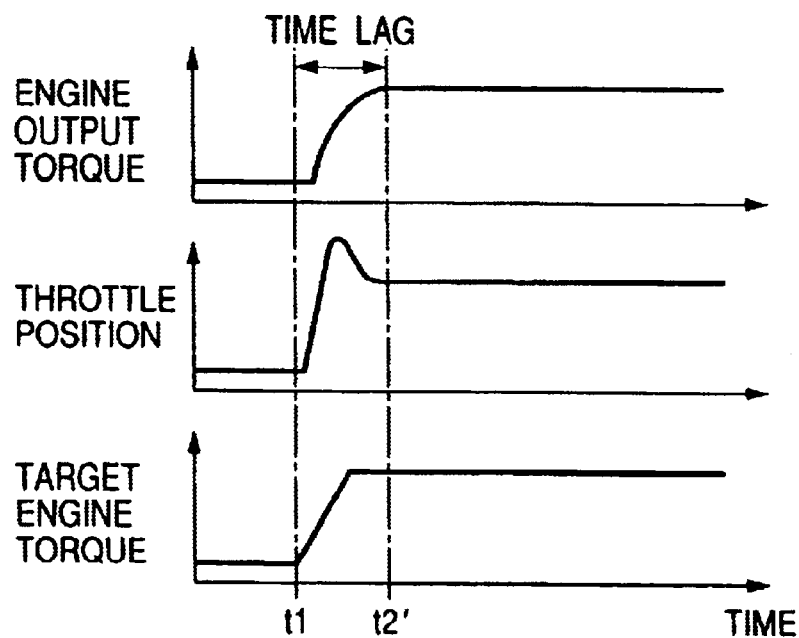
FIG. 4(b) shows a time chart which represents time lag-corrected changes in throttle position and engine output torque.

Usually, a time lag, as shown in FIG. 4(a), takes place between adjustment of the position of the throttle valve (i.e., time t1) and a time when the intake air passing through the throttle valve enters a cylinder of the engine, so that a target engine torque is reached (i.e. time t2). Therefore, in order to eliminate such a time lag, the translating circuit 22 is designed to have a structure, as shown in either of FIGS. 5(a) and 5(b), which works to correct the target engine torque in phase so as to advance the phase of change in position of the throttle valve, thereby compensating for a delay time between change in throttle position and change in quantity of air in a cylinder of the engine 2 to minimize the above time lag) as shown in FIG. 4(b).

Figure 5A:
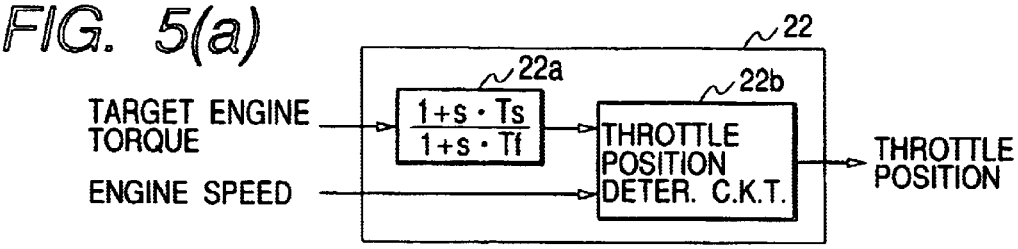
FIG. 5(a) is a block diagram which shows an internal structure of a translating circuit designed to produce a target throttle position.

The structure of FIG. 5(a) includes a phase compensator 22a and a throttle position determining circuit 22b. The phase compensator 22a identifies the response of engine torque to a change in throttle position in the form of a primary lag (1/(1+s·Ts)) and corrects the target engine torque using the reciprocal of the primary lag (1+s·Ts) and a filter characteristic (1/(1+s·Tf)) for improvement of the response. The throttle position determining circuit 22b determines the throttle position based on the target engine torque corrected by the phase compensator 22a and the engine speed.

Figure 5B:
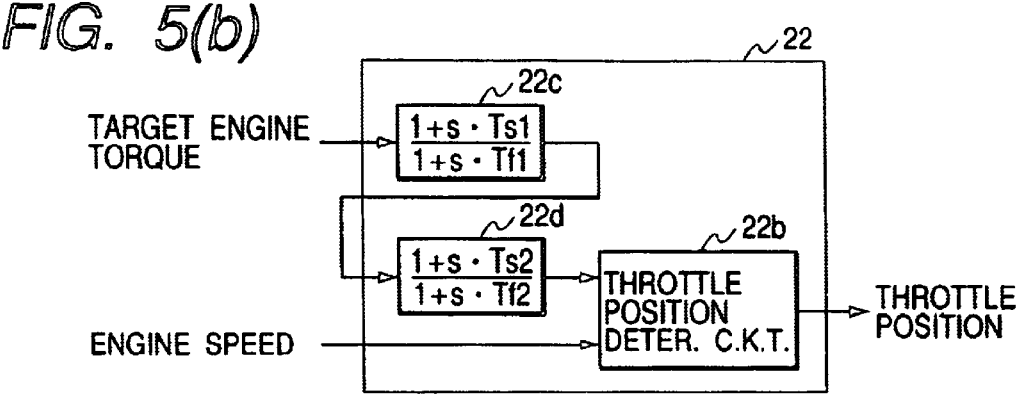
FIGS. 5(b), 5(c), and 5(d) show modification of the translating circuit of FIG. 5(a)

The structure of FIG. 5(b) includes two phase compensators 22c and 22d for compensating for a time lag between an operation of a driver or actuator for the throttle valve and a change in engine torque in addition to the above described intake air-caused time lag and a throttle position determining circuit 22b.

The phase compensator 22c, like the phase compensator 22a in FIG. 5(a), works to identify the response of engine torque to a change in throttle position in the form of a primary lag (1/(1+s19 Ts1)) and correct the target engine torque using the reciprocal of the primary lag (1+s·Ts1) and a filter characteristic (1/(1+s·Tf1)) for improvement of the response. The phase compensator 22d works to identify a time lag between a change in throttle position and output of a throttle control signal in the form of a primary lag (1/(1+s·Ts2)) and corrects an output of the phase compensator 22c using the reciprocal of the primary lag (1+s·Ts2) and a filter characteristic (1/(1+s·Tf2)) for improvement of the response. The throttle position determining circuit 22b are the same as the one shown in FIG. 5(a).

Figure 5C:
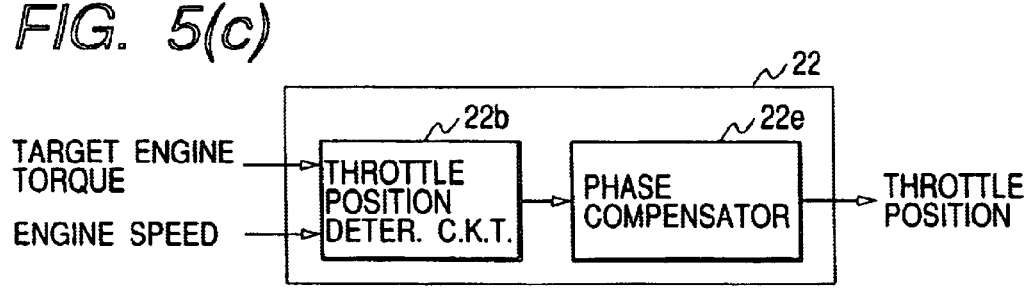
Figure 5D:
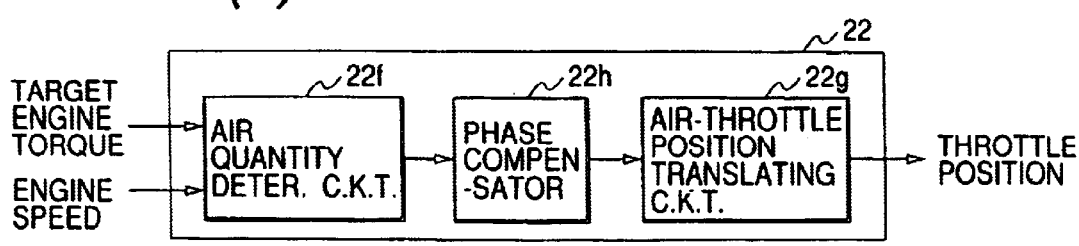

At least one of the phase compensators 22a, 22c, and 22d may alternatively be provided downstream of the throttle position determining circuit 22b. For instance, a phase compensator 22e, as shown in FIG. 5(c), which is designed to perform at least one of functions of the phase compensators 22a, 22c, and 22d may be provided behind the throttle position determining circuit 22b. The throttle position determining circuit 22b may alternatively, as shown in FIG. 5(d), consists of an air quantity determining circuit 22f and an air quantity-to-throttle position translating circuit 22g. The air quantity determining circuit 22f calculates the quantity of air to be supplied to the engine 2 as a function of the target engine torque and the engine speed. The air quantity-to-throttle position translating circuit 22g translates the quantity of air into a target throttle position. A phase compensator 22h which is designed to correct an output of the air quantity determining circuit 22f for compensating for the above described intake air-caused time lag.

Figure 6A:
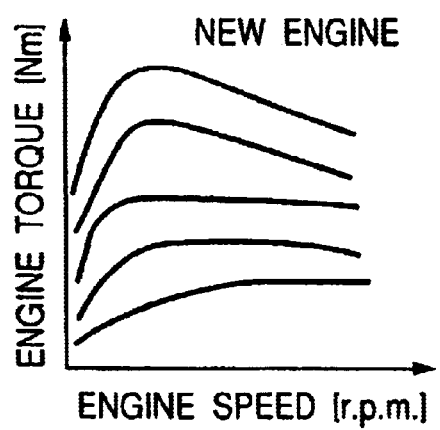
FIG. 6(a) shows an engine output torque-to-engine speed relation when an engine is new.
Figure 6B:
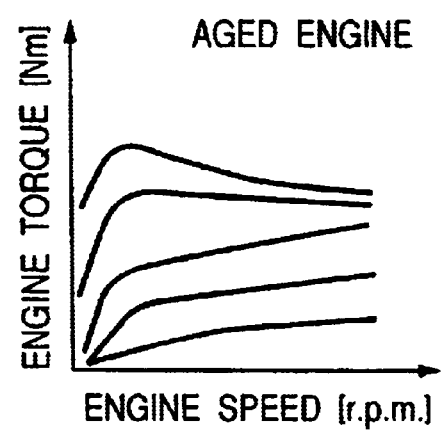
FIG. 6(b) shows an engine output torque-to-engine speed relation when an engine is aged.

The translation correcting circuit 24 works to compensate for a change in output torque of the engine 2 as a result of age and changes in environmental condition. Usually, the engine torque changes with time or in environmental condition from one, as shown in FIG. 6(b), projected when the engine is designed to one, as shown in FIG. 6(b). The translation correcting circuit 24 works to correct the target throttle position determined in the translating circuit 22 to minimize a difference between an engine torque estimated to be produced when the throttle valve is in the target throttle position and an actual engine torque. This is achieved by reading outputs of the above described sensors and switches (i.e., parameters indicating the operating conditions of the engine 2) from the engine ECU 6 through the communication line L and the controlled variables for controlling the engine 2 to calculate a shift in engine performance (i.e., engine torque) from one defined when the translating circuit 22 was designed and correcting the target throttle position as determined in the translating circuit 22 so as to compensate for that shift. The actual engine torque may be determined by a torque sensor designed to monitor the torsion of an output shaft of the engine 2 or calculated as a function of the speed of an output shaft of the torque converter of the automatic transmission 4 and the speed of the engine 2 in the following manner.

If the speed of the engine 2 is defined as Ne and the speed of the output shaft of the torque converter is defined as Nt, an input torque Tp of the torque converter is expressed as $$Tp = C(e) \times Ne2 \tag{1}$$

where e=Nt/Ne, and C(e) is a function of e.
The output torque Te of the engine is given below in relation to the engine speed Ne, the input torque Tp of the torque converter, and the inertia Ie of the torque converter.

$$Te = Tp + k \times Ie \times dNe/dt \tag{2}$$

where k=2×π/60.
Thus, the output torque Te of the engine 2 is determined using Eqs. (1) and (2) as a function of the engine speed Ne and the speed Nt of the output shaft of the torque converter.

The operating conditions of the engine 2 as used in determining the shift in engine performance may be the ignition timing of the engine 2, the boost pressure of the turbocharger, the atmospheric pressure, the opening timing (also referred to as VVT advanced angle below) of the intake and exhaust valves controlled by the above described variable valve timing (VVT) control mechanism, the amount of EGR, the air-fuel ratio of a mixture supplied to the engine 2, and the engine torque. The translation correcting circuit 22 may determine changes in those parameters from reference ones defined when the control system 100 was designed to correct the target throttle position.

Figure 7:
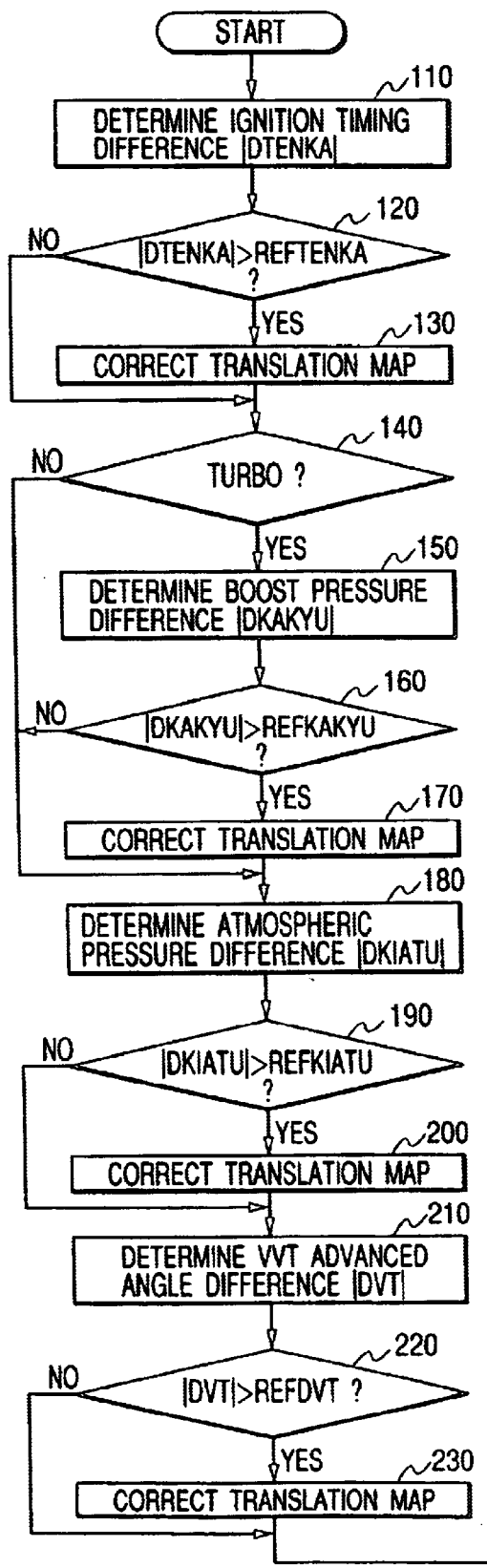
FIG. 7 is a flowchart of a program performed to translate a target engine torque into a target throttle position.
Figure 7:
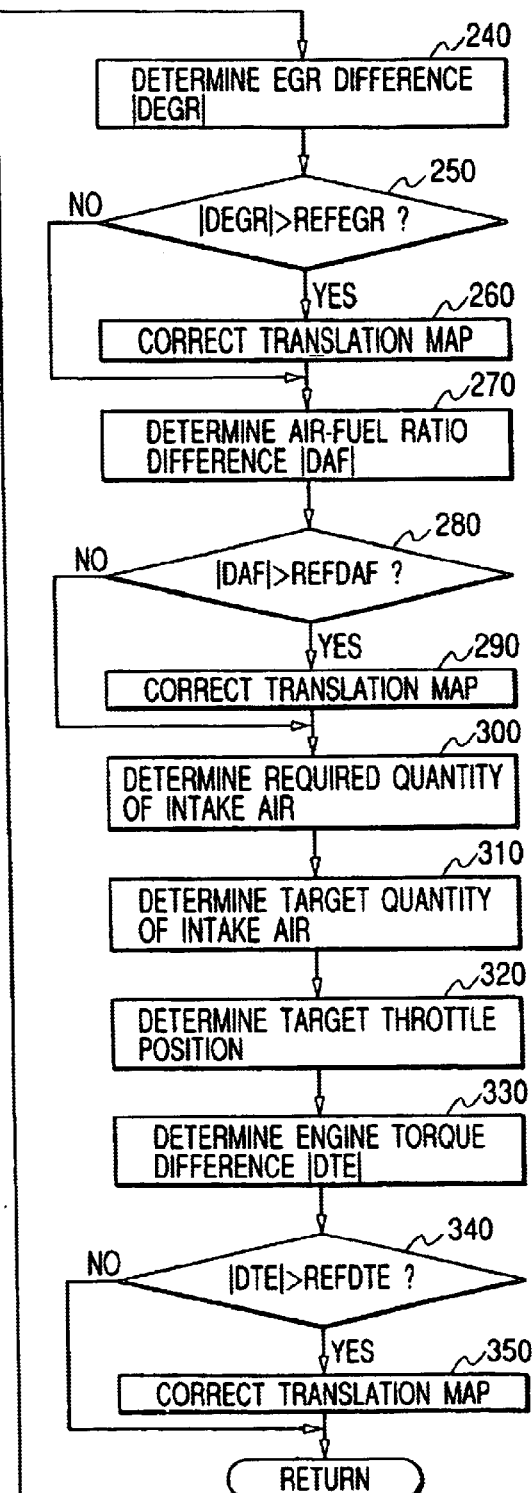

FIG. 7 is a flowchart of a program executed by the adapter 20 cyclically to carry out the functions of the translating circuit 22 and the translation correcting circuit 24 for translating the target engine torque into the target throttle position. Note that steps 300 to 320 are performed in the translating circuit 22, and other steps are performed in the translation correcting circuit 24.

Figure 8:
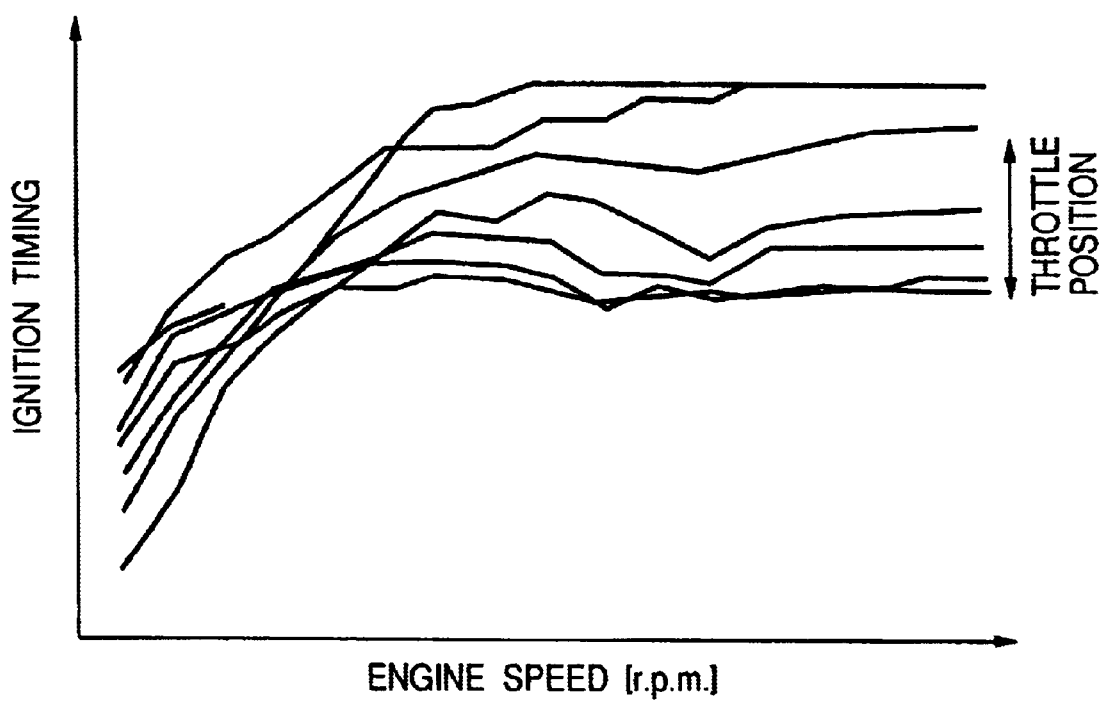
FIG. 8 is a map which represents ignition timing in terms of engine output torque and engine speed.

After entering the program, the routine proceeds to step 110 wherein the current speed of the engine 2 and the current position of the throttle valve are derived to determine a corresponding design ignition timing by look-up using a map, as shown in FIG. 8, which represents a relation among the throttle position, the engine speed, and the ignition timing as pre-defined when the control system 100 was designed, and a difference DTENKA between the corresponding design ignition timing and the current ignition timing derived from the engine ECU 6 is determined.

The routine proceeds to step 120 wherein it is determined whether an absolute value of the difference DTENKA is greater than an admissible ignition timing value REFTENKA or not that corresponds to a controlled engine torque error between a target engine torque and an actual engine torque as allowable in the control system 100. If a NO answer is obtained meaning that the absolute value of the difference DTENKA is smaller than the admissible ignition timing value REFTENKA, then the routine proceeds directly to step 140. Alternatively, if a YES answer is obtained, then the routine proceeds to step 130 wherein the translation map as employed in step 300 for determining a target throttle position is corrected using an ignition timing-torque map as shown in FIG. 9.

Figure 9:
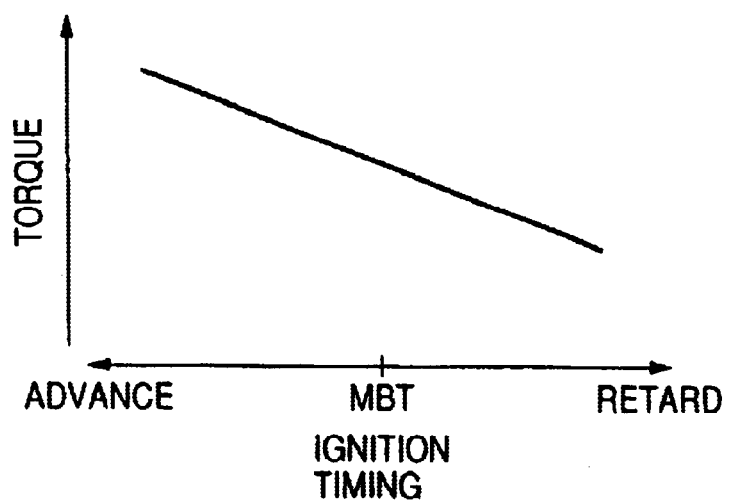
FIG. 9 is a map which represents engine output torque in terms of ignition timing.

The map of FIG. 9 represents an ignition timing-to-torque relation when the engine 2 is in an operating condition as expressed by specific values of the engine speed and the throttle position Note that MTB in FIG. 9 represents a reference ignition timing pre-defined when the adaptor 20 was designed. The adaptor 20 has stored therein a plurality of such maps for preselected different operating conditions of the engine 2. Step 130 corrects the translation map as employed in step 300 using one of the maps selected as a function of the current operating condition of the engine 2 so as to compensate for a controlled engine torque error arising from the difference DTENKA in the current operating condition of the engine 2.

Figure 10:
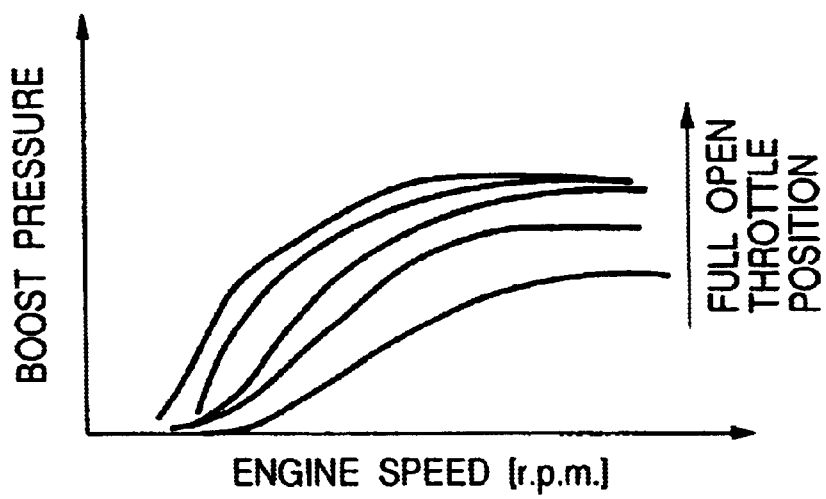
FIG. 10 is a map which represents boost pressure in terms of engine speed and throttle position.

The routine proceeds to step 140 wherein it is determined whether a turbocharger is installed in the vehicle or not. If a YES answer is obtained, the routine proceeds to step 150 wherein the current engine speed and the current throttle position are derived to determine a corresponding design boost pressure by look-up using a map, as shown in FIG. 10, defined when the control system 100 was designed, and an absolute value of a difference DKAKYU between the design boost pressure and an actual boost pressure derived from the engine ECU 6 is determined.

The routine proceeds to step 160 wherein it is determined whether the absolute value of the difference DKAKYU is greater than an admissible boost pressure value REFKAKYU or not that corresponds to a controlled engine torque error as allowable in the control system 100.

If a NO answer is obtained in step 160, then the routine proceeds directly to step 180. Alternatively, if a YES answer is obtained, then the routine proceeds to step 170 wherein the translation map as employed in step 300 for determining a target throttle position is corrected using a boost pressure-torque map as shown in FIG. 11.

Figure 11:
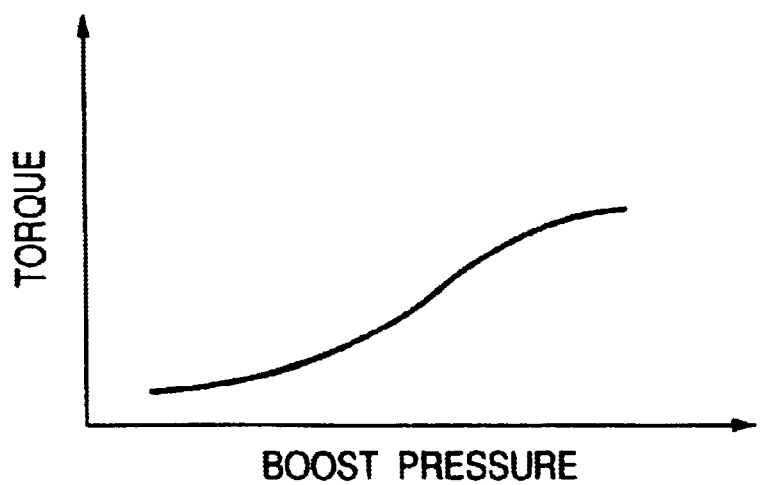
FIG. 11 is a map which represents engine output torque in terms of boost pressure.

The map of FIG. 11, like the map of FIG. 9, represents a boost pressure-to-torque relation when the engine 2 is in an operating condition as expressed by specific values of the engine speed and the throttle position. The adaptor 20 has stored therein a plurality of such maps for preselected different operating conditions of the engine 2. Step 170 corrects the translation map as employed in step 300 using one of the maps selected as a function of the current operating condition of the engine 2 to compensate for a controlled engine torque error arising from the difference DKAKYU in the current operating condition of the engine 2.

The routine proceeds to step 180 wherein an absolute value of a difference DKIATU between a design atmospheric pressure, as specified when the control system 100 was designed, and an actual atmospheric pressure is determined.

The routine proceeds to step 190 wherein it is determined whether the absolute value of the difference DKIATU is greater than an admissible atmospheric pressure value REFKIATU or not that corresponds to a controlled engine torque error as allowable in the control system 100. If the absolute value of the difference DKIATU is greater than the admissible atmospheric pressure value REFKIATU, then the routine proceeds to step 200 wherein the translation map as employed in step 300 is corrected using an atmospheric pressure-torque map (not shown).

The atmospheric pressure-torque map, like the ignition timing-torque map of FIG. 9, represents, as an example, a relation between the atmospheric pressure and the engine torque when the engine 2 is in an operating condition as expressed by specific values of the engine speed and the throttle position. The adaptor 20 has stored therein a plurality of such maps for preselected different operating conditions of the engine 2. Step 200 corrects the translation map as employed in step 300 using one of the maps selected as a function of the current operating condition of the engine 2 to compensate for a controlled engine torque error arising from the difference DKIATU in the current operating condition of the engine 2. Usually, the quantity of air mtf flowing through a throttle valve when the throttle valve is in a specific position may be expressed, as shown below, as a function of the atmospheric pressure.

$$mtf = Catf \times Pa/(R \times \sqrt{Ta}) \times \phi\alpha$$

where Catf=capacity coefficient of the throttle valve×area of flow path, Pa=the atmospheric pressure, R=coefficient of gas, Ta=the temperature of the atmosphere, and $\phi\alpha$=a function of the atmospheric pressure, the pressure of intake air, and the ratio of specific heat. Specifically, a change in atmospheric pressure will result in a change in engine output regardless of the degree of opening of the throttle valve. It is, thus, preferable to control the output torque of the engine as a function of the atmospheric pressure.

If a NO answer is obtained in step 190 meaning that the absolute value of the difference DKIATU is smaller than the admissible atmospheric pressure value REFKIATU or after completion of step 200, the routine proceeds to step 210 wherein the current engine speed and the current throttle position are derived to determine a corresponding design VVT advanced angle by look-up using a map representing a relation among the engine speed, the throttle position, and the VVT advanced angle, as defined when the adaptor 20 was designed, and an absolute value of a difference DVT between the design VVT advanced angle and an actual VVT advanced angle derived from the engine ECU 6 is determined.

Figure 12:
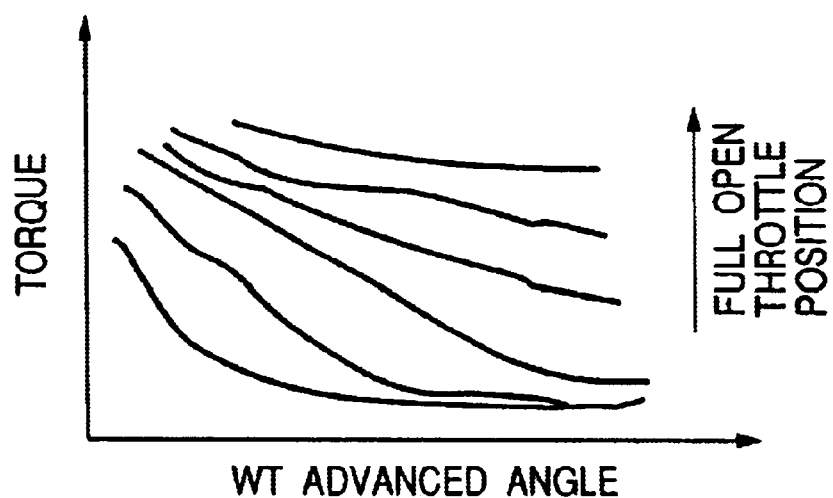
FIG. 12 is a map which represents engine output torque in terms of VVT advanced angle and throttle position.

The routine proceeds to step 220 wherein it is determined whether the absolute value of the difference DVT derived in step 210 is greater than an admissible VVT advanced angle REFDVT or not that is equivalent to a controlled engine torque error as allowable in the control system 100. If the absolute value of the difference DVT is greater than the admissible VVT advanced angle REFDVT, then the routine proceeds to step 230 wherein the translation map as employed in step 300 is corrected using a VVT advanced angle-torque map, as shown in FIG. 12.

The VVT advanced angle-torque map, like the ignition timing-torque map of FIG. 9, represents, as an example, a relation between the VVT advanced angle and the engine torque when the engine 2 is in an operating condition as expressed by specific values of the engine speed and the throttle position. The adaptor 20 has stored therein a plurality of such maps for preselected different operating conditions of the engine 2. Step 230 corrects the translation map as employed in step 300 using one of the maps selected as a function of the current operating condition of the engine 2 to compensate for a controlled engine torque error arising from the difference DVT in the current operating condition of the engine 2.

If a NO answer is obtained in step 220 meaning that the absolute value of the difference DVT is smaller than the admissible VVT advanced angle REFDVT or after completion of step 230, the routine proceeds to step 240 wherein the current engine speed and the current throttle position are derived to determine a corresponding design amount of EGR by look-up using a map (not shown) representing a relation among the engine speed, the throttle position, and the amount of EGR, as defined when the adaptor 20 was designed, and an absolute value of a difference DEGR between the design amount of EGR and an actual amount of EGR derived from the engine ECU 6 is determined.

Figure 13:
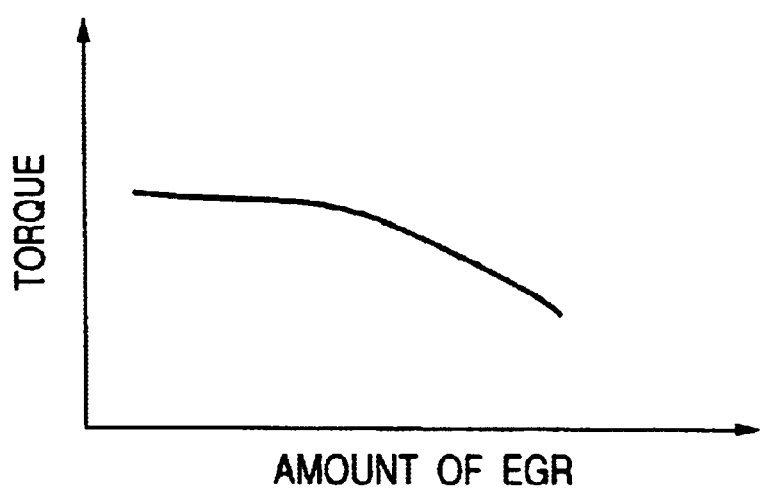
FIG. 13 is a map which represents engine output torque in terms of amount of recirculated exhaust gas.

The routine proceeds to step 250 wherein it is determined whether the absolute value of the difference DEGR derived in step 240 is greater than an admissible amount of EGR REFEGR or not that is equivalent to a controlled engine torque error as allowable in the control system 100 If the absolute value of the difference DEGR is greater than the admissible amount of EGR REFEGR, then the routine proceeds to step 260 wherein the translation map as employed in step 300 is corrected using a EGR-torque map, as shown in FIG. 13.

The EGR-torque map, like the ignition timing-torque map of FIG. 9, represents, as an example, a relation between the amount of EGR and the engine torque exhibited when the engine 2 is in an operating condition as expressed by specific values of the engine speed and the throttle position. The adaptor 20 has stored therein a plurality of such maps for preselected different operating conditions of the engine 2. Step 260 corrects the translation map as employed in step 300 using one of the maps selected as a function of the current operating condition of the engine 2 to compensate for a controlled engine torque error arising from the difference DEGR in the current operating condition of the engine 2.

If a NO answer is obtained in step 250 meaning that the absolute value of the difference DEGR is smaller than the admissible amount of EGR REFEGR or after completion of step 260, the routine proceeds to step 270 wherein the current engine speed and the current throttle position are derived to determine a corresponding design air-fuel ratio look-up using a map (not shown) representing a relation among the engine speed, the throttle position, and the air-fuel ratio, as defined when the adaptor 20 was designed, and an absolute value of a difference DAF between the design air-fuel ratio and an actual air-fuel ratio derived from the engine ECU 6 is determined.

Figure 14:
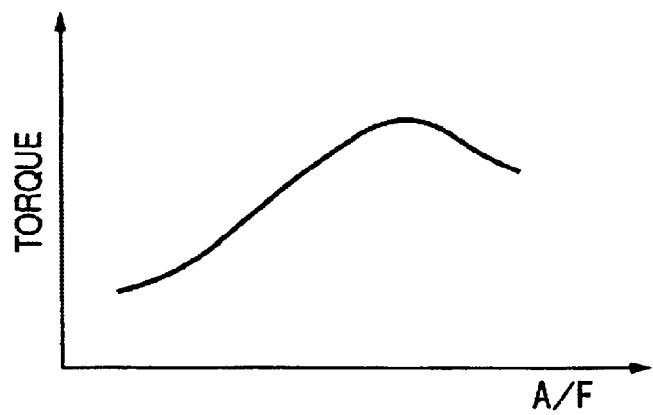
FIG. 14 is a map which represents engine output torque in terms of air-fuel ratio.

The routine proceeds to step 280 wherein it is determined whether the absolute value of the difference DAF derived in step 260 is greater than an admissible air-fuel ratio REFDAF or not that is equivalent to a controlled engine torque error as allowable in the control system 100. If the absolute value of the difference DAF is greater than the admissible air-fuel ratio REFDAF, then the routine proceeds to step 290 wherein the translation map as employed in step 300 is corrected using an AF ratio-torque map, as shown in FIG. 14.

The AF ratio-torque map, like the ignition timing-torque map of FIG. 9, represents, as an example, a relation between the air-fuel ratio of a mixture to be supplied to the engine 2 and the engine torque exhibited when the engine 2 is in an operating condition as expressed by specific values of the engine speed and the throttle position. The adaptor 20 has stored therein a plurality of such maps for preselected different operating conditions of the engine 2. Step 290 corrects the translation map as employed in step 300 using one of the maps selected as a function of the current operating condition of the engine 2 to compensate for a controlled engine torque error arising from the difference DAF in the current operating condition of the engine 2.

If a NO answer is obtained in step 280 meaning that the absolute value of the difference DAF is smaller than the admissible air-fuel ratio REFDAF or after completion of step 290, the routine proceeds to step 300 wherein the engine speed and the target engine torque are derived to determine the quantity of air (i.e., intake air to be supplied to the engine 2 through the throttle valve) required to bring an actual output torque of the engine 2 into agreement with the target engine torque by look-up using the translation map as corrected by the previous steps.

The translation map, as employed in step 300, is a map which lists quantities of intake air required to bring the torque of the engine 2 into agreement with a target one in terms of engine speeds and target engine torques and is so made as to match with the engine 2 when the adaptor 20 is designed and corrected, as described above, so as to compensate for the controlled engine torque errors caused by changes in performance of the engine 2 as a result of age and changes in environmental condition After completion of the operation in step 300, the routine proceeds to step 310 wherein the required quantity of intake air is corrected in the phase compensator 22*a*, 22*c*, or 22*d* so as to compensate for the response lag of the engine 2 (i e., a lag between adjustment of the position of the throttle valve and a time when the intake air passing through the throttle valve enters a cylinder of the engine, so that a target engine torque is reached) to produce a target quantity of intake air to be supplied to the engine 2. The phase compensator 22*a*, 22*c*, or 22*d*, as discussed previously, corrects the target engine torque directly, but step 310 corrects the required quantity of intake air as a parameter equivalent to the target engine torque.

The routine proceeds to step 320 wherein the target quantity of intake air derived in step 310 and the engine speed are used to determine a target position of the throttle valve (i.e., the degree of opening of the throttle valve) required to bring the quantity of air supplied to the engine 2 through the throttle valve into agreement with the target quantity of intake air by look-up using the map stored in the translating circuit 22. The target throttle position is outputted in the form of a signal to the engine ECU 6.

Upon receiving the signal indicative of the target throttle position, the ECU 6 produces a throttle valve energizing signal required to move the position of the throttle valve into agreement with the target throttle position and outputs it to the throttle actuator. If the translation map as employed in step 300 (i.e., the target throttle position) matches with the behavior of the engine 2, an actual output torque of the engine 2 will match up with the target one. If not, an error in controlled engine torque will arise. In order to minimize the error, the following steps 330 to 350 are performed.

Specifically, after completion of the operation in step 320, the routine proceeds to step 330 wherein an absolute value of a difference DTE between an actual output torque of the engine 2 derived from the engine ECU 6 and the target engine torque is determined. The routine proceeds to step 340 wherein it is determined whether the absolute value of the difference DTE determined in step 330 is greater than an admissible controlled engine torque REFDTE or not that is a controlled engine torque error as allowable in the control system 100.

If the absolute value of the difference DTE is greater than the admissible controlled engine torque REFDTE, then the routine proceeds to step 350 wherein a parameter indicative of the target engine torque in the translation map as employed in step 300 is corrected so as to compensate for the difference DTE.

As apparent from the above discussion, the power train control system in this embodiment works to translate the target engine torque as determined in the ECU manager 10 into the throttle position required to bring the output of the engine 2 into agreement with the target one and output it to the engine ECU 6 and the ATECU 18. This, therefore, allows control programs that are similar to those used in conventional control systems to be used as they are in the engine ECU 6 and the ATECU 8, thereby permitting the control system 100 to be developed in a decreased period of time.

The correction of the translation map as used in step 300 to translate the target engine torque into the position of the throttle valve is, as described above, achieved to compensate for the controlled engine torque errors resulting from differences between engine operation related conditions: the ignition timing of the engine 2, the boost pressure of the turbocharger, the atmospheric pressure, the VVT advanced angle of the intake and exhaust valves of the engine 2, the amount of EGR, the air-fuel ratio of a mixture supplied to the engine 2, and the output torque of the engine 2 and initial design values thereof, but operating conditions (e.g., loads acting on the engine 2) of auxiliary mechanisms driven by the engine 2 such as an alternator, a hydraulic pump of a power steering system, and a compressor of an air conditioner may also be used to correct the translation map.

Figure 15A:
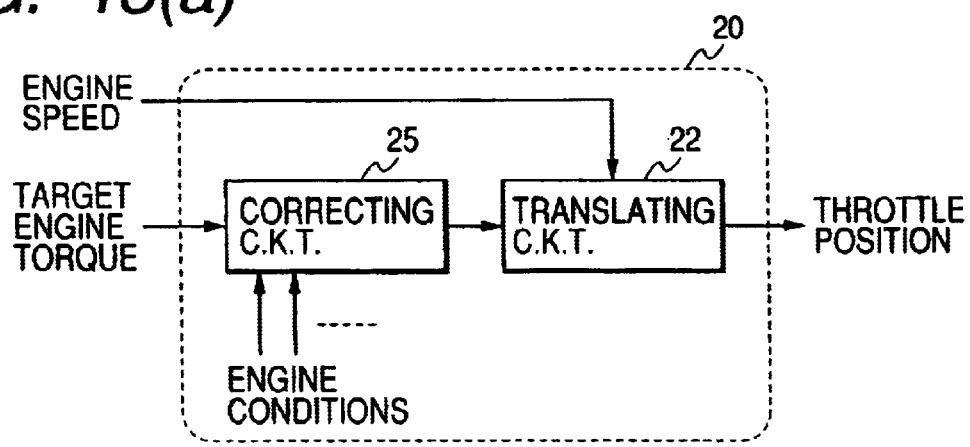
FIGS. 15(*a*) and 15(*b*) are block diagrams which show internal structures of modification of the adaptor of FIG. 1.
Figure 15B:
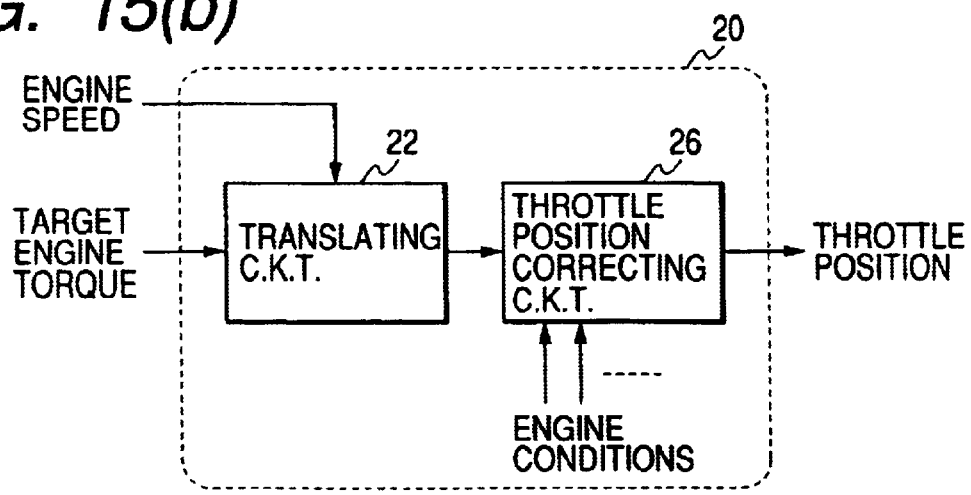

The adaptor 20 may alternatively be designed to have a structure, as shown in either of FIGS. 15(*a*) and 15(*b*). In FIG. 15(*a*), the adaptor 20 consists of a translating circuit 22 and a target engine torque correcting circuit 25. The target engine torque correcting circuit 25 works to correct a target engine torque determined by the ECU manager 10 in a manner, as described later, based on the engine operation related conditions and provides a signal indicative thereof to the translating circuit 22. The adaptor 20 determines a target throttle position as corrected to compensate for a lag in adjusting the torque of the engine 2 to the target one.

In FIG. 15(*b*), the adaptor 20 consists of a translating circuit 22 and a throttle position correcting circuit 26. The translating circuit 22 translates a target engine torque determined by the ECU manager 10 into a throttle position using a give translation map. The throttle position correcting circuit 26 corrects the throttle position determined in the translating circuit 22 based on the engine operation related conditions and provides a signal indicative thereof to the translating circuit 22. The adaptor 20 determines a target throttle position as corrected to compensate for a lag in adjusting the torque of the engine 2 to the target one.

Figure 16:
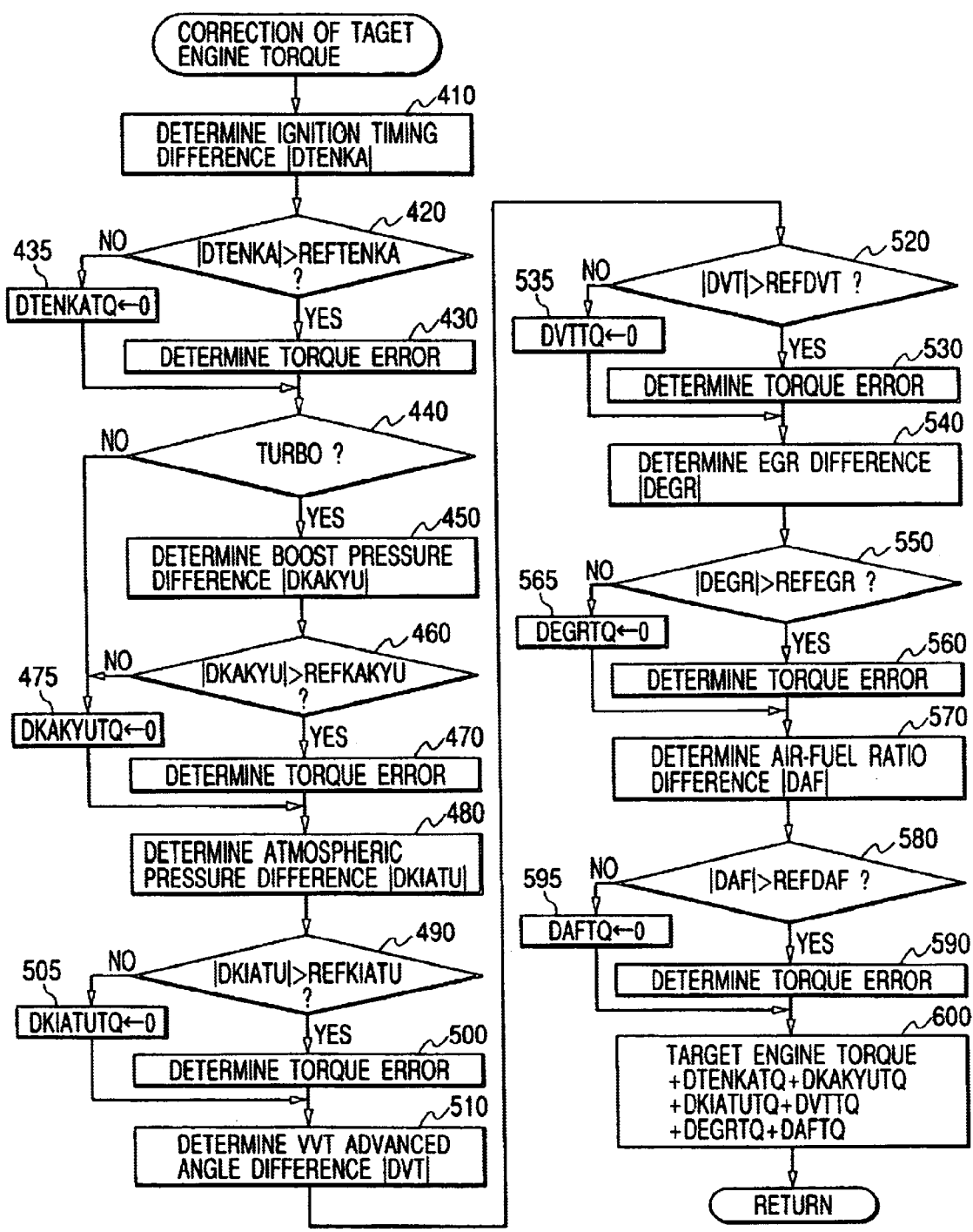
FIG. 16 is a flowchart of a program to be executed to correct a target engine torque.
Figure 17A:
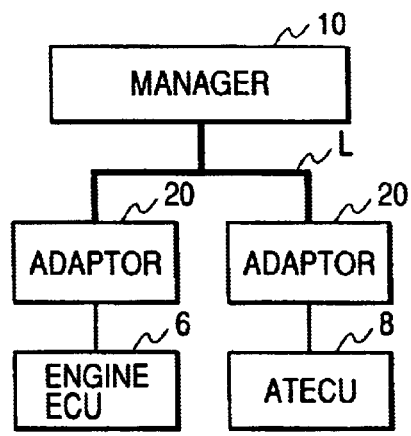
FIGS. 17(*a*). 17(*b*), 17(*c*), and 17(*d*) are block diagrams which show modification of the integrated control system of FIG. 1.
Figure 17B:
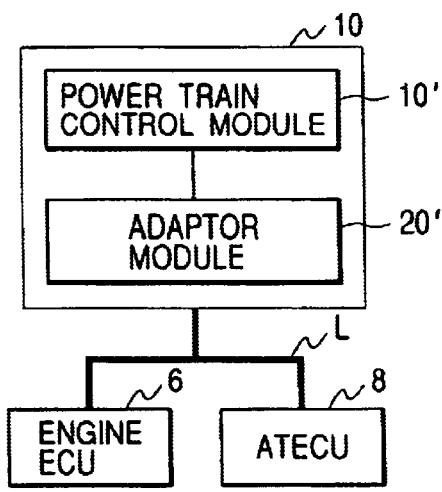
Figure 17C:
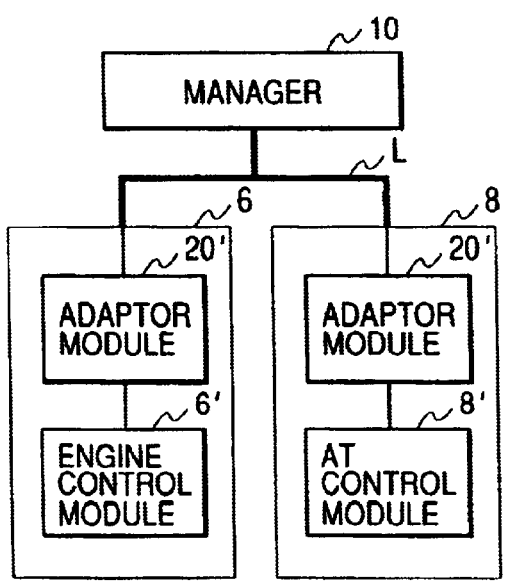
Figure 17D:
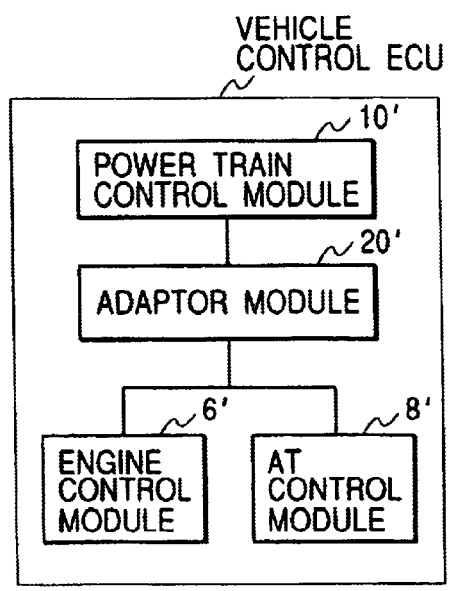

FIG. 16 shows a target engine torque correcting program as executed in the adaptor 20 of FIG. 15(*a*).

After entering the program, the routine proceeds to step 410 wherein the current speed of the engine 2 and the current position of the throttle valve are derived to determine a corresponding design ignition timing in the same manner as in step 110 of FIG. 7 and an absolute value of a difference DTENKA between the corresponding design ignition timing and the current ignition timing derived from the engine ECU 6 is determined.

The routine proceeds to step 420 wherein it is determined whether the absolute value of the difference DTENKA is greater than an admissible ignition timing value REFTENKA or not that is equivalent to a controlled engine torque error between a target engine torque and an actual engine torque as allowable in the control system 100. If a YES answer is obtained meaning that the absolute value of the difference DTENKA is greater than the admissible ignition timing value REFTENKA, then the routine proceeds to step 430 wherein a torque difference DTENKATQ that is equivalent to a controlled engine torque error arising from the ignition timing difference DTENKA is calculated by look-up using the map in FIG. 9. Alternatively, if a NO answer is obtained, then the routine proceeds to step 435 wherein a parameter indicative of the torque difference DTENKATQ is set to zero (0).

After step 435 or 430, the routine proceeds to step 440 wherein it is determined whether a turbocharger is installed in the vehicle or not. If a YES answer is obtained, the routine proceeds to step 450 wherein the current engine speed and the current throttle position are derived to determine a corresponding design boost pressure in the same manner as in step 150 of FIG. 7, and an absolute value of a difference DKAKYU between the design boost pressure and an actual boost pressure derived from the engine ECU 6 is determined.

The routine proceeds to step 460 wherein it is determined whether the absolute value of the difference DKAKYU is greater than an admissible boost pressure value REFKAKYU or not that is equivalent to a controlled engine torque error as allowable in the control system 100.

If a YES answer is obtained in step 460 meaning that the difference DKAKYU is greater than the admissible boost pressure value REFKAKYU, then the routine proceeds to step 470 wherein a torque difference DKAKYUTQ that is equivalent to a controlled engine torque error arising from the boost pressure difference DKAKYU is calculated using the boost pressure-torque map in FIG. 11.

If a NO answer is obtained in step 440, then the routine proceeds to step 475 wherein a parameter indicative of the torque difference DKAKYUTQ is set to zero (0).

After step 475 or 470, the routine proceeds to step 480 wherein an absolute value of a difference DKIATU between a design atmospheric pressure and a current atmospheric pressure is determined in the same manner as in step 180 of FIG. 7.

The routine proceeds to step 490 wherein it is determined whether the absolute value of the difference DKIATU is greater than an admissible atmospheric pressure value REFKIATU or not that is equivalent to a controlled engine torque error as allowable in the control system 100.

If the absolute value of the difference DKIATU is greater than the admissible atmospheric pressure value REFKIATU, then the routine proceeds to step 500 wherein a torque difference DKIATUTQ that is equivalent to a controlled engine torque error arising from the atmospheric pressure difference DKIATU is calculated using a given atmospheric pressure-torque map (not shown). Alternatively, if a NO answer is obtained in step 490 meaning that the absolute value of the difference DKIATU is smaller than the admissible atmospheric pressure value REFKIATU, then the routine proceeds to step 505 wherein a parameter indicative of the torque difference DKIATUTQ is set to zero (0).

After step 505 or 500, the routine proceeds to step 510 wherein the current engine speed and the current throttle position are derived to determine a corresponding design VVT advanced angle in the same manner as in step 210 of FIG. 7, and an absolute value of a difference DVT between the design VVT advanced angle and an actual VVT advanced angle derived from the engine ECU 6 is determined.

The routine proceeds to step 520 wherein it is determined whether the absolute value of the difference DVT derived in step 510 is greater than an admissible VVT advanced angle REFDVT or not that is equivalent to a controlled engine torque error as allowable in the control system 100. If the absolute value of the difference DVT is greater than the admissible VVT advanced angle REFDVT, then the routine proceeds to step 530 wherein a torque difference DVTTQ that is equivalent to a controlled engine torque error arising from the VVT advanced angle difference DVT is calculated using a given VVT advanced angle-torque map (not shown). Alternatively, if a NO answer is obtained in step 520 meaning that the absolute value of the difference DVT is smaller than the admissible VVT advanced angle REFDVT, then the routine proceeds to step 535 wherein a parameter indicative of the torque difference DVTTQ is set to zero (0).

After step 530 or 535, the routine proceeds to step 540 wherein the current engine speed and the current throttle position are derived to determine a corresponding design amount of EGR in the same manner as in step 240 of FIG. 7, and an absolute value of a difference DEGR between the design amount of EGR and an actual amount of EGR derived from the engine ECU 6 is determined.

The routine proceeds to step 550 wherein it is determined whether the absolute value of the difference DEGR derived in step 540 is greater than an admissible amount of EGR REFEGR or not that is equivalent to a controlled engine torque error as allowable in the control system 100. If the absolute value of the difference DEGR is greater than the admissible amount of EGR REFEGR, then the routine proceeds to step 560 wherein a torque difference DEGRTQ that is equivalent to a controlled engine torque error arising from the EGR amount difference DEGR is calculated using the EGR-torque map as shown in FIG. 13. Alternatively, if a NO answer is obtained in step 550 meaning that the absolute value of the difference DEGR is smaller than the admissible amount of EGR REFEGR, then the routine proceeds to step 565 wherein a parameter indicative of the torque difference DEGRTQ is set to zero (0).

After step 560 or 565, the routine proceeds to step 570 wherein the current engine speed and the current throttle position are derived to determine a corresponding design air-fuel ratio in the same manner as in step 270 of FIG. 7, and an absolute value of a difference DAF between the design air-fuel ratio and an actual air-fuel ratio derived from the engine ECU 6 is determined.

The routine proceeds to step 580 wherein it is determined whether the absolute value of the difference DAF derived in step 570 is greater than an admissible air-fuel ratio REFDAF or not that is equivalent to a controlled engine torque error as allowable in the control system 100.

If the absolute value of the air-fuel ratio difference DAF is greater than the admissible air-fuel ratio REFDAF, then the routine proceeds to step 590 wherein a torque difference DAFTQ that is equivalent to a controlled engine torque error arising from the air-fuel ratio difference DAF is calculated using the AF ratio-torque map as shown in FIG. 14. Alternatively, if a NO answer is obtained in step 580, then the routine proceeds to step 595 wherein a parameter indicative of the torque difference DAFTQ is set to zero (0). After step 590 or 595, the routine proceeds to step 600 wherein values of all the torque differences DTENKATQ, DKAKYUQ, DKIATUTQ, DVTTQ, DEGRTQ, and DAFTQ determined in the above steps are added to the target engine torque inputted from the ECU manager 10 to correct it, thereby compensating for controlled engine torque errors resulting from shifts in the above engine operation related conditions from initial set values. The corrected target engine torque is outputted in the form of a signal to the translating circuit 22. The translating circuit 22 translates the input into a target throttle position.

The adaptor 20 is, as described above, disposed in the communication line L connecting at one end with the ECU manager 10 and at the other end with the engine ECU 6 and the ATECU 8, but two same adaptors 20, as shown in FIG. 17(*a*), may be provided for the engine ECU 6 and the ATECU 8, respectively.

The ECU manager 10 may be so designed as to perform the function of the adaptor 20. For example, the ECU manager 10 may be made of a microcomputer which, as shown in FIG. 17(*b*), consists of a power train control module 10' designed to perform the same function as that of the ECU manager 10 of FIG. 1 and an adaptor module 20' designed to perform the same function as that of the adaptor 20 of FIG. 1.

The engine ECU 6 and the ATECU 8 may be so designed to have the function of the adaptor 20. For example, the engine ECU 6 may be made of a microcomputer which, as shown in FIG. 17(*c*), consists of an adaptor module 20' designed to perform the same function as that of the adaptor 20 of FIG. 1 and an engine control module 6' designed to perform the same function of the engine ECU 6 of FIG. 1. Similarly, the ATECU 8 may be made of a microcomputer which consists of an adaptor module 20' designed to perform the same function as that of the adaptor 20 of FIG. 1 and an AT control module 8' designed to perform the same function as that of the ATECU 8 of FIG. 1.

Further, as shown in FIG. 17(*d*), the power train control module 10', the adaptor module 20', the engine control module 6', and the AT control module 8' may be fabricated in a single microcomputer as a vehicle control ECU.

The ECU manager 10 may also be coupled with a brake control unit which controls brakes to be applied to wheels of the vehicle for controlling braking behavior of the vehicle. Additionally, the ECU manager 10 may be coupled with an information system(s) such as a navigation system or the like to derive data on the slope and altitude of a road on which the vehicle is not running for controlling a drive system and a brake system of the vehicle to optimize the torque transmitted to the driven wheels and the brake forces applied to the wheels.

Figure 18:
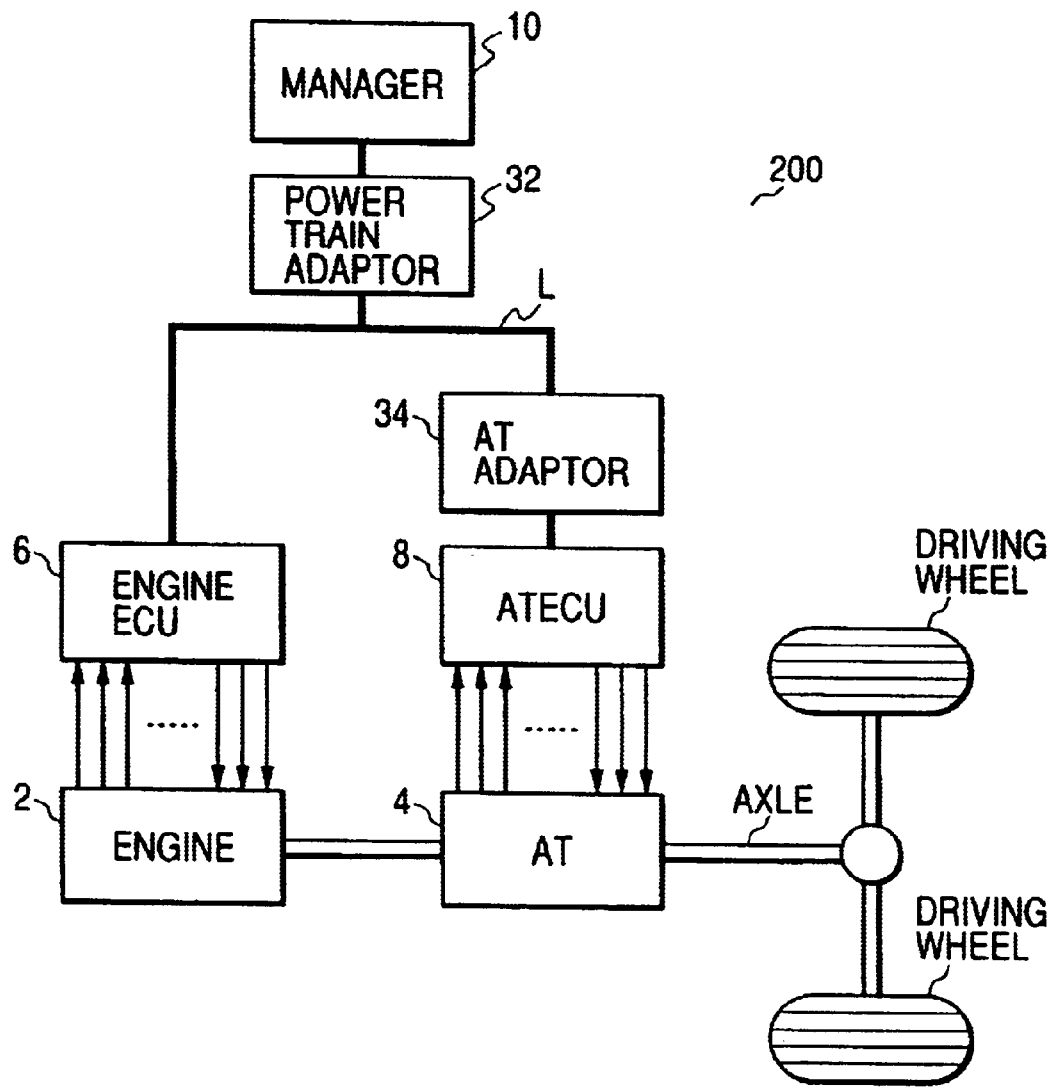
FIG. 18 is a block diagram which shows an integrated control system according to the second embodiment of the invention.

FIG. 18 shows an automotive integrated control system 200 according to the second embodiment of the invention which is designed to output an engine torque lowering request from the ATECU 8 to the ECU manager 10 for reduce uncomfortable shift shock acting on the vehicle operator when the speed of the automatic transmission 4 is shifted.

The control system 200 includes the engine ECU 6, the ATECU 8, the ECU manager 10, the power train adaptor 32, and the AT adaptor 34.

The engine ECU 6 works to perform the same function as that in the first embodiment and is also designed to receive a request signal indicative of the degree to which the ignition timing is to be retarded (referred to as a retard ignition angle) through the communication line L to and perform a task of retard control of spark advance of the engine 2. The ATECU 8 works to perform the same function as that in the first embodiment and is also designed to calculate a target retard ignition angle required to reduce a gear shifting shock produced when the automatic transmission 4 is shifted in speed and output a signal indicative thereof.

Figure 19:
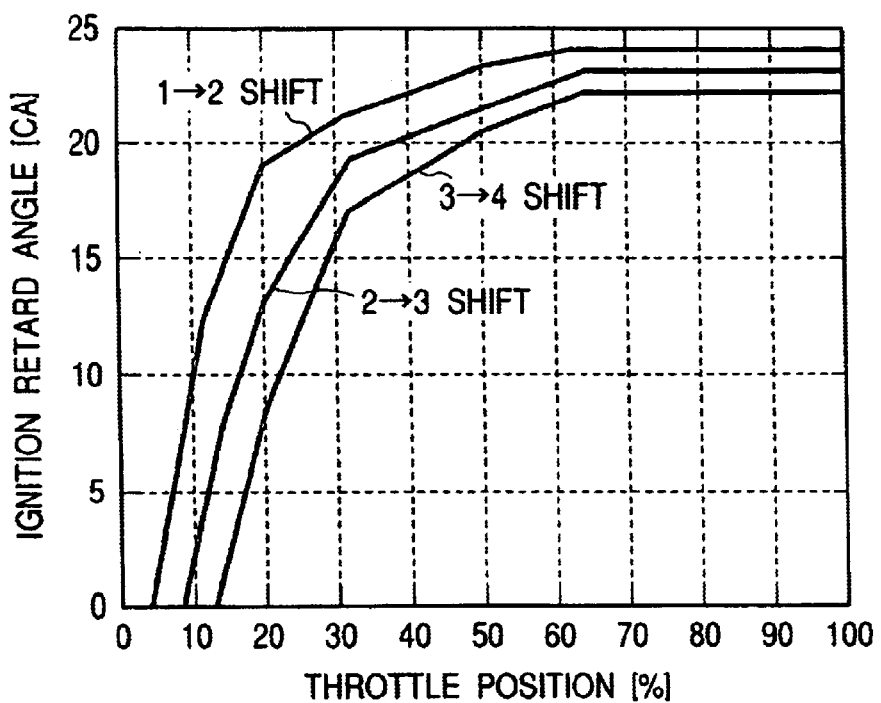
FIG. 19 is a map which represents an ignition retard angle in terms of throttle position and shift range.

The ECU manager 10 is so designed as to perform the same function as that in the first embodiment. The determination of the retard ignition angle to reduce the gear shifting shock is achieved in the ATECU 8 by calculating the degree to which the ignition timing is to be retarded in the form of a crank angle (CA) as a function of the current throttle position (%) and the speed to which the automatic transmission 4 is to be shifted using a map, as shown in FIG. 19.

Figure 20:
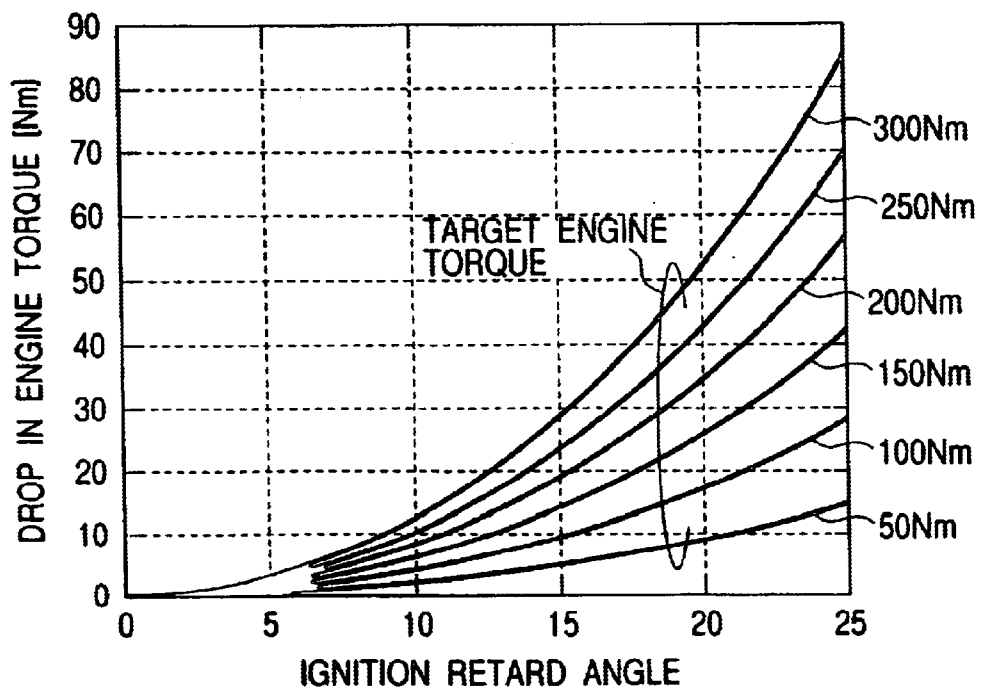
FIG. 20 is a map which represents a target drop in engine torque in terms of target engine torque and ignition retard angle.

The AT adaptor 34 is disposed in the communication line L extending from the ATECU 8 to a junction of the power train adaptor 32 and the engine ECU 6. The AT adaptor 34 receives the target retard ignition angle from the ATECU 8 and translate it into a required drop in engine torque using a map as shown in FIG. 20. Specifically, the AT adaptor 34 monitors the current engine torque (N·m) and converts the target retard ignition angle (CA) into the required drop in engine torque (N·m) for reducing the gear shifting shock as a function of the current engine torque. The AT adaptor 34 outputs a signal indicative of the required drop in engine torque to the power train adaptor 32.

The power train adaptor 32 works to perform the same function as that of the adaptor 20 in the first embodiment and is also designed to receive the required drop in engine torque and the target engine torque produced by the ECU manager 10 to determine a target position of the throttle valve and a target retard ignition angle required to bring an output of the engine 2 into agreement with a target level that is the target engine torque determined by the ECU manage 10 plus the required drop in engine torque as expressed in negative sign determined by the AT adaptor 34.

Figure 21:
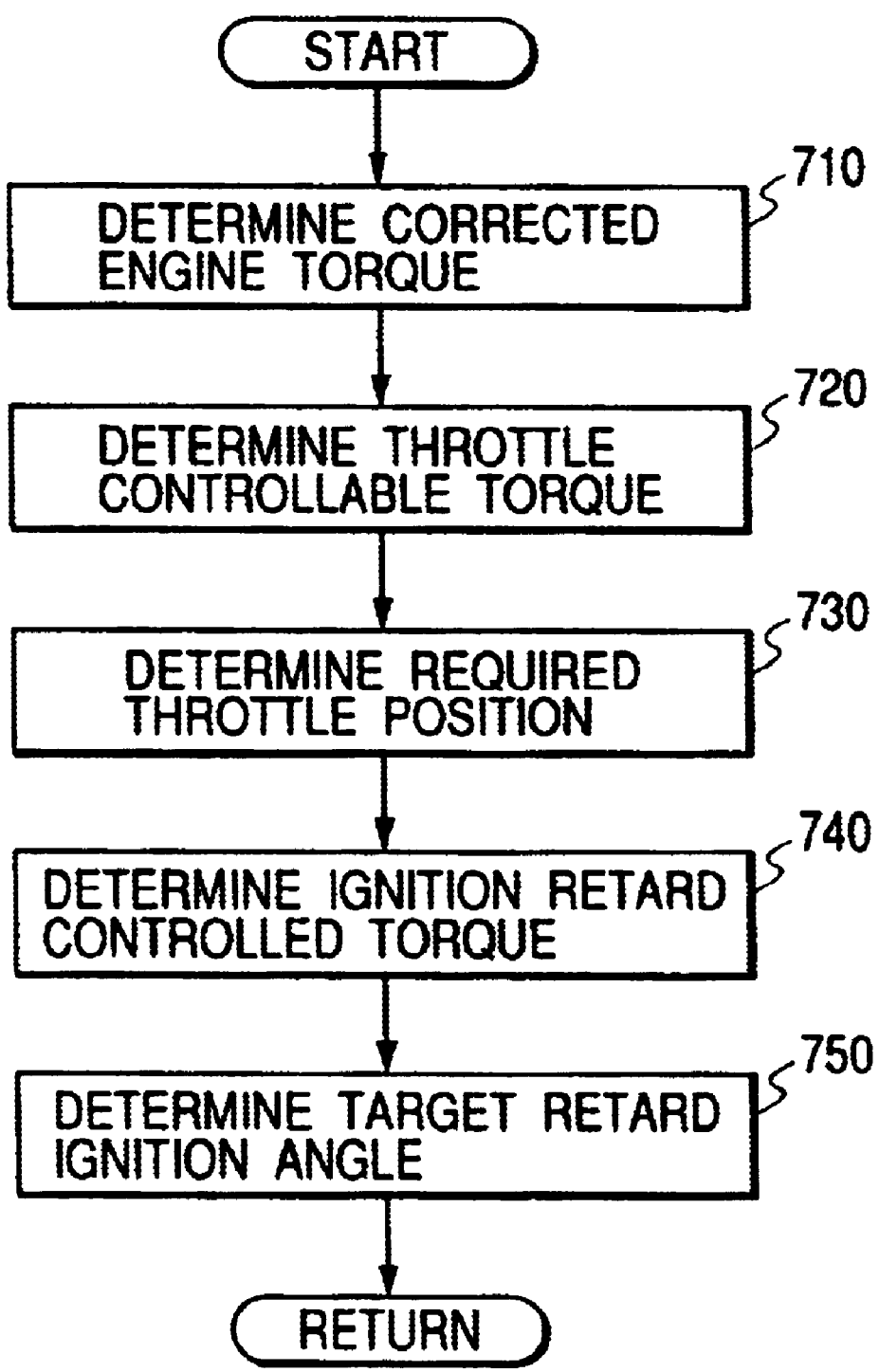
FIG. 21 is a flowchart of a program executed to determine a target retard ignition angle.

The determination of the target throttle position and the target retard ignition angle in the power train adaptor 32 is achieved by executing a program as shown in FIG. 21. The target throttle position and the target retard ignition angle are outputted from the power train adaptor 32 to the engine ECU 6 The target throttle position is also outputted to the ATECU 8.

First, in step 710, the required drop in engine torque, as expressed in negative sign, determined by the AT adaptor 34 is added to the target engine torque determined by the ECU manage 10 to produce a corrected target engine torque Ters(n).

The routine proceeds to step 720 wherein a maximum amount of engine torque which is permitted to be decreased by changing the position of the throttle valve in one of execution cycles of the program of FIG. 21 and defined as a torque drop limit Tairlm. If a difference between the corrected target engine torque Ters(n) determined in step 710 and a throttle controllable torque Tair(n−1) as defined one program cycle earlier is greater than the torque drop limit TairLm, the value of the throttle controllable torque Tair(n−1) minus the torque drop limit TairLm is determined to update the throttle controllable torque Tair(n−1) as Tair(n). Alternatively, if the difference between the corrected target engine torque Ters(n) and the throttle controllable torque Tair(n−1) is smaller than the torque drop limit TairLm, the corrected target engine torque Ters(n) is defined as the throttle controllable torque Tair(n). This determines a possible change in engine torque without a response lag of the throttle valve.

Subsequently, the routine proceeds to step 730 wherein the throttle controllable torque Tair(n) determined in step 720 is defined as a target engine torque and translated into a target throttle position in the same manner as that in the translating circuit 22 of the first embodiment.

The routine proceeds to step 740 wherein a difference between the throttle controllable torque Tair(n) derived in step 720 and the corrected engine torque Ters(n) derived in step 710 is determined and defined as an ignition retard controlled torque that is a lack of engine torque drop difficult to achieve by actuating the throttle valve.

The routine proceeds to step 750 wherein the degree to which the ignition timing is to be retarded or target retard ignition angle required to decrease the output of the engine 2 by the ignition retard controlled torque as derived in step 740 is calculated. This calculation may be achieved by look-up using the map of FIG. 20. The target retard ignition angle is outputted to the engine ECU 6. The engine ECU 6 retards the ignition timing by the target retard ignition angle to drop the output of the engine 2.

If, in step 720, the difference between the corrected target engine torque Ters(n) and the throttle controllable torque Tair(n−1) is smaller than the torque drop limit TairLm, and the corrected target engine torque Ters(n) is defined as the throttle controllable torque Tair(n), the ignition retard controlled torque is determined in step 740 to be zero (0). Thus, in this case, the engine ECU 6 does not perform the retard control of spark advance.

As apparent from the above discussion, as much of the required drop in engine torque as possible is first achieved by controlling the position of the throttle valve. The remainder is achieved by retarding the ignition timing. This, therefore, minimizes an undesirable raise in temperature of exhaust emissions and increase in harmful exhaust emission caused by retarded ignition timing. Additionally, the drop in engine torque by the throttle valve will decrease the quantity of intake air supplied to the engine 2 as compared with a case where the required drop in engine torque is achieved only by the retard control of spark advance, thus resulting in a decrease in intake air or consumption of fuel.

The drop in engine torque may also be achieved for the purpose of reducing thermal loads on clutches of the automatic transmission 4.

Figure 22:
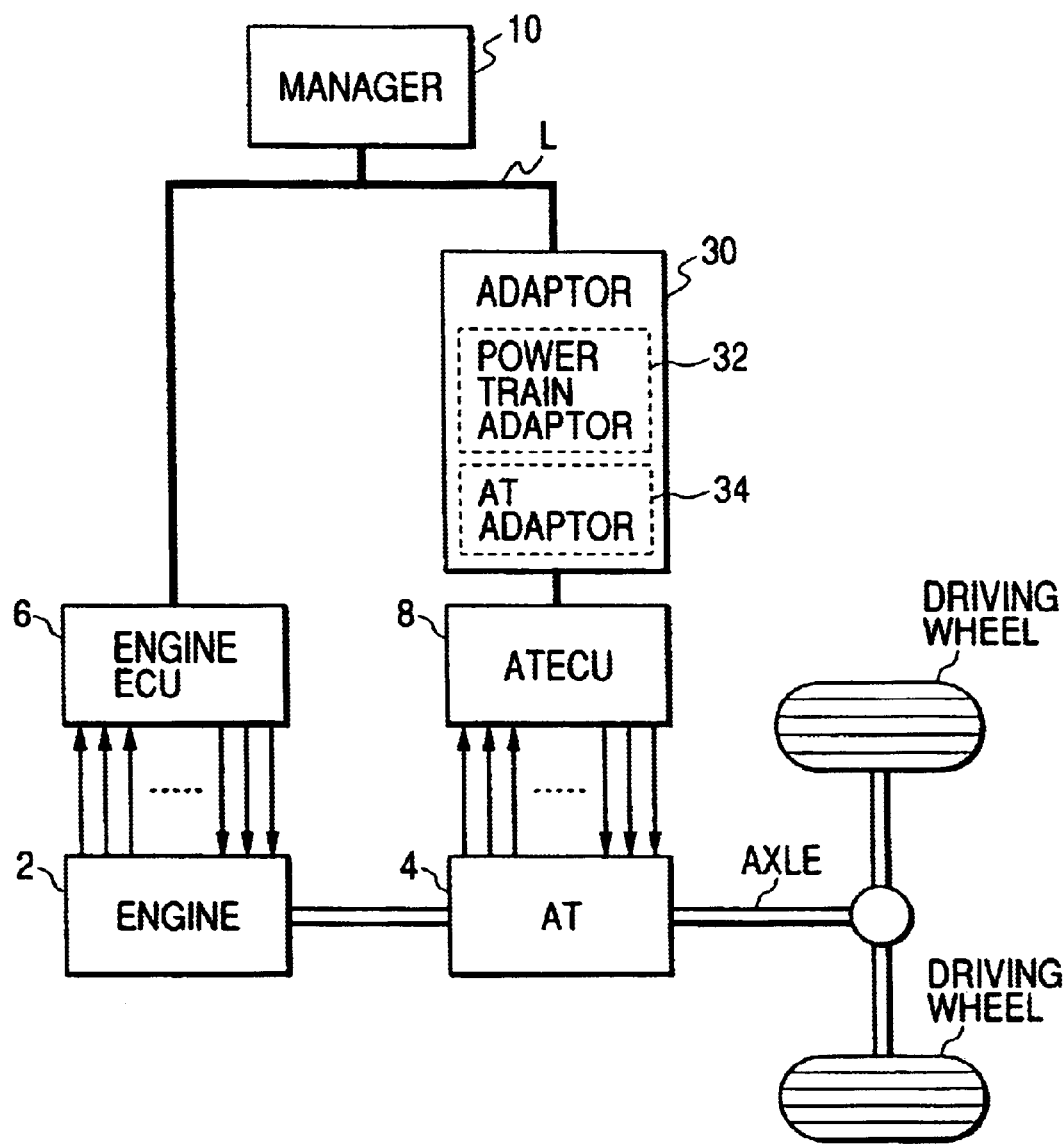
FIG. 22 is a block diagram which shows a modification of the integrated control system, as shown in FIG. 18, according to the second embodiment of the invention.

FIG. 22 shows a modification of the control system 200 of the second embodiment.

The engine ECU 6 is designed to perform engine control based on the target engine torque determined by the ECU manager 10. The adaptor 30 is disposed between the ECU manager 10 and the ATECU 8. The adaptor 30 consists of the power train adaptor 32 and the AT adaptor 34 which are the same as the ones in FIG. 18. The engine ECU 6 receives signals indicative of the target engine torque determined by the ECU manager 10 and the required drop in engine torque determined by the adaptor 30 and correct the target engine torque. The engine ECU 6 may work to control the quantity of fuel to be injected to the engine 2 and/or the VVT advanced angle as well as the throttle position and the ignition timing to determine a target controlled engine torque in terms of the fuel economy.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For example, the ECU manager 10 may determine a target engine output power instead of the target engine torque and produce signals indicative thereof for use in the control tasks to be executed in the engine ECU 6 and the ATECU 6. Further, instead of the variable valve timing control mechanism to control the ignition timing of the engine 2 variably, a typical valve lift control mechanism may alternatively be used which works to change the amount of lift of the intake and exhaust valves of the engine 2 by changing valve-lifting cams. In this case, an absolute value of a difference of an actual amount of lift of the intake and exhaust valves of the engine 2 and a pre-defined amount of lift thereof may be determined and used in correcting the translation map employed in step 300 of FIG. 7 and the target engine torque in step 600 of FIG. 16.

What is claimed is:

1. An integrated control system for a vehicle comprising:
 a manager circuit providing a plurality of target values of given controlled variables;

a plurality of control circuits designed to perform given control tasks of controlling operations of a plurality of controlled elements installed in the vehicle for bringing the controlled variables into agreement with the target values provided by said manager circuit; and a translating circuit translating the target value of at least one of the controlled variables into a target value of a second controlled variable which is different from the at least one of the controlled variables and predefined as being used in performing at least one of the control tasks in said control circuits to bring the one of the controlled variables into agreement with the target value.

2. An integrated control system as set forth in claim 1, further comprising condition comparing means for comparing a given controlled variable-related condition associated with the controlled element which is controlled in operation using the second controlled variable with a reference controlled variable-related condition to determine a difference therebetween and translation correcting means for correcting a translation scheme of said translating circuit so as to compensate for an error between the target value of the one of the controlled variables and an actual one arising from the difference between the controlled variable-related condition and the reference controlled variable-related condition.

3. An integrated control system as set forth in claim 1, further comprising condition comparing means for comparing a given controlled variable-related condition of the controlled element which is controlled in operation using the second controlled variable with a reference controlled variable-related condition to determine a difference therebetween and correcting means for correcting the target value of the one of the controlled variables so as to compensate for an error between the target value and an actual one arising from the difference between the controlled variable-related condition and the reference controlled variable-related condition.

4. An integrated control system as set forth in claim 1, wherein at least one of said control circuits produces a target value of a third controlled variable as a control request to another of said controlled circuits which is different from the controlled variable provided by said manager circuit to said another of said control circuits, and further comprising a controlled variable translating circuit designed to translate the target value of the third controlled variable into a target value of the controlled variable provided by said manager circuit to said another of said control circuits.

5. An integrated control system as set forth in claim 4, wherein said translating circuit translates the target value of the controlled variable provided by said manager circuit to said another of said control circuits plus the target value translated by said control variable translating circuit into a target value of the second controlled variable which is predefined as being used in performing the control task in said another of said control circuits.

6. An integrated control system as set forth in claim 1, wherein said control circuits are designed to control operations of controlled elements of a power trains of the vehicle including an engine, and said manager circuit determines the target values of the controlled variables so that a drive force of the vehicle reaches a target one.

7. An integrated control system as set forth in claim 6, wherein said translating circuit translates the target value of the controlled variable into the target value of the second controlled variable as a function of speed of the engine.

8. An integrated control system as set forth in claim 6, wherein one of said control circuits designed to control the engine is an engine control circuit, at least one of said control circuits except said engine control circuit provides a control request signal indicative of a target retard ignition angle to said engine control circuit, and further comprising a controlled variable translating circuit designed to translate the target retard ignition angle into a target value of the controlled variable provided by said manager circuit to said engine control circuit.

9. An integrated control system as set forth in claim 8, wherein said translating circuit adds the target value of the controlled variable provided by said manager circuit to said engine control circuit to the target value translated by said controlled variable translating circuit to provide an ultimate target value of the controlled variable to said engine control circuit.

10. An integrated control system as set forth in claim 6, further comprising condition comparing means for comparing a given operating condition of the engine with a pre-defined reference operating condition of the engine to determine a difference therebetween and translation correcting means for correcting a translation scheme of said translating circuit so as to compensate for an error between the target value of the one of the controlled variables and an actual one arising from the difference between the given operating condition and the pre-defined reference operating condition.

11. An integrated control system as set forth in claim 6, further comprising condition comparing means for comparing a given operating condition of the engine with a pre-defined reference operating condition of the engine to determine a difference therebetween and correcting means for correcting the target value of the one of the controlled variables so as to compensate for an error between the target value and an actual one arising from the difference between the given operating condition and the pre-defined reference operating condition.

12. An integrated control system as set forth in claim 10, wherein the difference as determined by said condition comparing means is a difference between an actual ignition timing of the engine and a pre-defined reference ignition timing of the engine.

13. An integrated control system as set forth in claim 11, wherein the difference as determined by said condition comparing means is a difference between an actual ignition timing of the engine and a pre-defined reference ignition timing of the engine.

14. An integrated control system as set forth in claim 10, wherein the difference as determined by said condition comparing means is a difference between an actual atmospheric pressure and a pre-defined reference atmospheric pressure.

15. An integrated control system as set forth in claim 11, wherein the difference as determined by said condition comparing means is a difference between an actual atmospheric pressure and a pre-defined reference atmospheric pressure.

16. An integrated control system as set forth in claim 10, wherein the difference as determined by said condition comparing means is a difference between an actual boost pressure of a turbocharger installed in the engine and a pre-defined reference boost pressure of the turbocharger.

17. An integrated control system as set forth in claim 11, wherein the difference as determined by said condition comparing means is a difference between an actual boost pressure of a turbocharger installed in the engine and a pre-defined reference boost pressure of the turbocharger.

18. An integrated control system as set forth in claim 10, wherein the difference as determined by said condition comparing means is a difference between an actual opening timing of intake and exhaust valves of the engine and a pre-defined reference opening timing of the intake and exhaust valves.

19. An integrated control system as set forth in claim 11, wherein the difference as determined by said condition comparing means is a difference between an actual opening timing of intake and exhaust valves of the engine and a pre-defined reference opening timing of the intake and exhaust valves.

20. An integrated control system as set forth in claim 10, wherein the difference as determined by said condition comparing means is a difference between an actual amount of lift of intake and exhaust valves of the engine and a pre-defined reference amount of lift of the intake and exhaust valves.

21. An integrated control system as set forth in claim 11, wherein the difference as determined by said condition comparing means is a difference between an actual amount of lift of intake and exhaust valves of the engine and a pre-defined reference amount of lift of the intake and exhaust valves.

22. An integrated control system as set forth in claim 10, wherein the difference as determined by said condition comparing means is a difference between an actual amount of exhaust gas recirculated through an exhaust gas recirculation system and a pre-defined reference amount of recirculated exhaust gas.

23. An integrated control system as set forth in claim 11, wherein the difference as determined by said condition comparing means is a difference between an actual amount of exhaust gas recirculated through an exhaust gas recirculation system and a pre-defined reference amount of recirculated exhaust gas.

24. An integrated control system as set forth in claim 10, wherein the difference as determined by said condition comparing means is a difference between an air-fuel ratio of a mixture supplied to the engine and a pre-defined reference air-fuel ratio of the engine.

25. An integrated control system as set forth in claim 11, wherein the difference as determined by said condition comparing means is a difference between an air-fuel ratio of a mixture supplied to the engine and a pre-defined reference air-fuel ratio of the engine.

26. An integrated control system as set forth in claim 10, wherein the difference as determined by said condition comparing means is a difference between a load exerted on the engine produced by an auxiliary mechanism driven by the engine and a pre-defined reference load.

27. An integrated control system as set forth in claim 11, wherein the difference as determined by said condition comparing means is a difference between a load exerted on the engine produced by an auxiliary mechanism driven by the engine and a pre-defined reference load.

28. An integrated control system as set forth in claim 10, wherein the difference as determined by said condition comparing means is a difference between an actual output torque of the engine and a pre-defined reference output torque of the engine.

29. An integrated control system as set forth in claim 11, wherein the difference as determined by said condition comparing means is a difference between an actual output torque of the engine and a pre-defined reference output torque of the engine.

30. An integrated control system as set forth in claim 20, wherein the power train includes an automatic transmission with a torque converter, and the actual output torque is determined based on a speed of the engine and a speed of an output shaft of the torque converter.

31. An integrated control system as set forth in claim 1, wherein the at least one of the controlled variables is one of a target engine torque and a target gear ratio and the second controlled variable is an engine throttle position.

32. An integrated control system for a vehicle comprising:
a manager circuit providing a plurality of target values of given controlled variables;
a plurality of control circuits designed to perform given control tasks of controlling operations of a plurality of controlled elements installed in the vehicle for bringing the controlled variables into agreement with the target values provided by said manager circuit; and
a translating circuit translating the target value of at least one of the controlled variables into a target value of a second controlled variable which is predefined as being used in performing at least one of the control tasks in said control circuits to bring the one of the controlled variables into agreement with the target value;
wherein said control circuits are designed to control operations of controlled elements of a power trains of the vehicle including an engine, and said manager circuit determines the target values of the controlled variables so that a drive force of the vehicle reaches a target one; and
one of said control circuits designed to control the engine is an engine control circuit, said manager circuit provides a controlled parameter indicative of either of a target engine torque and a target engine output power as the target value of the controlled variables to said engine control circuit, said translating circuit translates the controlled parameter into a second controlled parameter indicative of a target position of a throttle valve of the engine, and said engine control circuit performs a throttle control task to actuate the throttle valve so that the target position of the throttle valve is reached.

33. An integrated control system as set forth in claim 32, wherein said translating circuit works to translate the controlled parameter into the second controlled parameter based on a response characteristic of the engine to a change in position of the throttle valve for compensating for a response lag between a change in engine torque and a change in position of the throttle valve.

34. An integrated control system as set forth in claim 32, wherein at least one of said control circuits except said engine control circuit provides a control request signal indicative of a target retard ignition angle to said engine control circuit, and further comprising a controlled variable translating circuit designed to translate the target retard ignition angle into a correction parameter which indicates an amount of engine torque or engine output power to be changed and is equivalent in kind to the controlled variable provided by said manager circuit to said engine control circuit, and wherein said translating circuit corrects the controlled parameter indicative of either of the target engine torque and the target engine output power using the correction parameter and uses the corrected controlled parameter to produce the second controlled parameter indicative of the target position of the throttle valve of the engine.

35. An integrated control system as set forth in claim 34, wherein said engine control circuit is also designed to perform an ignition timing control task of retarding ignition timing of the engine, and wherein said translating circuit produces the second controlled parameter indicative of the target position of the throttle valve in a range within which as much of either of the target engine torque and the target engine output power as possible is reached and also translates a lack of either of the target engine torque and the target engine output power which is not achieved by control of the throttle valve into a target retard ignition angle achieved by performing said ignition timing control task in said engine control circuit.

* * * * *